US008673137B2

(12) United States Patent
Verdegan et al.

(10) Patent No.: US 8,673,137 B2
(45) Date of Patent: Mar. 18, 2014

(54) APPARATUS, SYSTEM AND METHOD FOR DETECTING THE PRESENCE OF GENUINE SERVICEABLE PRODUCT COMPONENTS

(75) Inventors: Barry M. Verdegan, Stoughton, WI (US); John T. Carroll, III, Columbus, IN (US); Matthew L. Schneider, Seymour, IN (US); Michael T. Zuroski, Sun Prairie, WI (US); Nathan A. Whitaker, Nolensville, TN (US); James L. Walls, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 318 days.

(21) Appl. No.: 13/044,018

(22) Filed: Mar. 9, 2011

(65) Prior Publication Data

US 2011/0220560 A1    Sep. 15, 2011

Related U.S. Application Data

(60) Provisional application No. 61/311,943, filed on Mar. 9, 2010, provisional application No. 61/423,418, filed on Dec. 15, 2010.

(51) Int. Cl.
*B01D 35/143* (2006.01)
*G06Q 99/00* (2006.01)
*G05D 99/00* (2006.01)

(52) U.S. Cl.
USPC ............. 210/91; 96/417; 210/96.1; 210/143; 210/739; 235/435; 701/29.6; 701/36; 701/113

(58) Field of Classification Search
USPC .......... 210/85, 87, 90, 91, 94, 96.1, 143, 739; 210/741; 235/435, 439; 340/603, 626; 701/29.1, 29.4, 29.5, 29.6, 29.7, 36, 701/113; 95/417–423; 96/417–423; 705/318
See application file for complete search history.

(56) References Cited

U.S. PATENT DOCUMENTS 4,646,066 A * 2/1987 Baughman et al. ........... 340/540
4,920,937 A    5/1990 Sasaki et al.
(Continued)

FOREIGN PATENT DOCUMENTS

EP    0889448 B1    10/2003
EP    0945603 B1    6/2005
WO    2008/131447 A1    10/2008

OTHER PUBLICATIONS

International Search Report for international application No. PCT/US2011/027723, dated Nov. 14, 2011 (9 pages).

(Continued)

*Primary Examiner* — Joseph Drodge
(74) *Attorney, Agent, or Firm* — Foley & Lardner LLP

(57) ABSTRACT

A process, system, and component configuration are described that discourages customer acceptance/use of will-fit, reconditioned, and counterfeit product components, by determining whether or not a serviceable product component is genuine. If a component is determined to not be genuine, then appropriate action may be taken to warn operators and document such findings. For example, one or more markers are disposed or otherwise put on the subject serviceable product component and serves as a targeted feature, and/or a particular characteristic of the filter itself is identified as the targeted feature. A sensor is used to detect the targeted feature and obtain information unique to the serviceable product component. The targeted feature(s) identifies the particular serviceable component as genuine and forms the basis for determining whether a genuine component has been installed. In some circumstances, a fluid filter product is the component that is the subject detection.

19 Claims, 17 Drawing Sheets

(56) References Cited

U.S. PATENT DOCUMENTS

| | | | |
|---|---|---|---|
| 5,041,976 A | 8/1991 | Marko et al. | |
| 5,337,357 A | 8/1994 | Chou et al. | |
| 5,359,972 A | 11/1994 | Isaka | |
| 5,380,047 A | 1/1995 | Molee et al. | |
| 5,517,961 A | 5/1996 | Ward | |
| 5,709,190 A | 1/1998 | Suzuki | |
| 5,960,767 A | 10/1999 | Akimoto et al. | |
| 6,129,066 A | 10/2000 | Umierski | |
| 6,138,639 A | 10/2000 | Hiraya et al. | |
| 6,172,602 B1 * | 1/2001 | Hasfjord | 340/438 |
| 6,173,690 B1 | 1/2001 | Iriya et al. | |
| 6,418,905 B1 | 7/2002 | Baudlot et al. | |
| 6,533,926 B2 | 3/2003 | Hawkins et al. | |
| 6,537,444 B2 | 3/2003 | Wilberscheid et al. | |
| 6,553,290 B1 * | 4/2003 | Pillar | 701/29.4 |
| 6,572,025 B1 | 6/2003 | Nishikado et al. | |
| 6,615,789 B2 | 9/2003 | Inoue et al. | |
| 6,637,402 B2 | 10/2003 | Liu | |
| 6,671,611 B1 | 12/2003 | Peltier | |
| 6,711,524 B2 | 3/2004 | Wolf et al. | |
| 6,725,828 B1 | 4/2004 | Han et al. | |
| 6,739,512 B2 | 5/2004 | Guerrero et al. | |
| 6,799,550 B2 | 10/2004 | Wirth | |
| 6,892,693 B2 | 5/2005 | Montgomery et al. | |
| 7,021,279 B1 | 4/2006 | Pott et al. | |
| 7,089,420 B1 | 8/2006 | Durst et al. | |
| 7,136,743 B2 | 11/2006 | Peltier | |
| 7,152,047 B1 | 12/2006 | Nagel | |
| 7,162,035 B1 | 1/2007 | Durst et al. | |
| 7,177,553 B2 | 2/2007 | Ono | |
| 7,216,239 B2 | 5/2007 | Kawamura | |
| 7,280,772 B2 | 10/2007 | Adkins et al. | |
| 7,283,630 B1 | 10/2007 | Doljack | |
| 7,333,001 B2 | 2/2008 | Lane et al. | |
| 7,350,708 B2 | 4/2008 | Melick et al. | |
| 7,364,074 B2 | 4/2008 | He et al. | |
| 7,442,291 B1 * | 10/2008 | Discenzo et al. | 210/85 |
| 7,614,546 B2 | 11/2009 | Grant et al. | |
| 7,681,564 B2 | 3/2010 | Umierski et al. | |
| 7,785,477 B2 * | 8/2010 | Oldendorf et al. | 210/739 |
| 7,922,914 B1 * | 4/2011 | Verdegan et al. | 210/741 |
| 8,118,997 B2 * | 2/2012 | Ebrom et al. | 210/91 |
| 2002/0121132 A1 * | 9/2002 | Breed et al. | 73/146 |
| 2002/0144937 A1 * | 10/2002 | Wilberscheid et al. | 210/85 |
| 2002/0144938 A1 * | 10/2002 | Hawkins et al. | 210/85 |
| 2003/0025598 A1 | 2/2003 | Wolf et al. | |
| 2004/0011713 A1 * | 1/2004 | Ushioda et al. | 210/85 |
| 2004/0256328 A1 * | 12/2004 | Jornitz et al. | 210/739 |
| 2006/0092210 A1 | 5/2006 | Maniam et al. | |
| 2008/0011841 A1 | 1/2008 | Self et al. | |
| 2008/0161989 A1 | 7/2008 | Breed | |
| 2009/0072671 A1 * | 3/2009 | Stelzer et al. | 310/338 |
| 2009/0080760 A1 | 3/2009 | Knysh et al. | |
| 2009/0120177 A1 | 5/2009 | Preston | |
| 2009/0194066 A1 | 8/2009 | Ashizawa et al. | |
| 2010/0037683 A1 | 2/2010 | Barnikow et al. | |
| 2011/0062060 A1 * | 3/2011 | Royal et al. | 210/85 |

OTHER PUBLICATIONS

Written Opinion of the International Searching Authority for international application No. PCT/US2011/027723, dated Nov. 14, 2011 (6 pages).

* cited by examiner

APPARATUS, SYSTEM AND METHOD FOR DETECTING THE PRESENCE OF GENUINE SERVICEABLE PRODUCT COMPONENTS

This application claims the benefit of U.S. Provisional Application Ser. No. 61/423,418, filed on Dec. 15, 2010, and titled "Filter Apparatus with Surface Acoustic Wave Sensor" and claims the benefit of U.S. Provisional Application Ser. No. 61/311,943, filed Mar. 9, 2010 and titled "Process, System and Program Product for Product Identification", the entirety of which are incorporated by reference herewith.

FIELD

The application herein generally relates to detection of genuine serviceable product components to prevent or at least limit counterfeiting/unauthorized use and to improve system reliability. Particularly, the application relates to detection of a serviceable product component in a protected system, such as for example a filter apparatus in an engine, and relates to identifying whether such component is genuine for the system in which it is being installed. The application herein also generally relates to filter installation, servicing, and replacement. In particular, the application herein relates to a filter apparatus that filters fluids in a protected system of an engine, where the filter apparatus employs a sensor, such as a surface acoustic wave sensor, that helps to identify that an appropriate filter is present.

BACKGROUND

Where products and markets are mature and where will-fitters, unauthorized reconditioners, and counterfeiters seek to capitalize on an established market participant, it is common for challenges to arise in continuing to serve the market under such direct competition. With respect to counterfeiting, while it is difficult to estimate the financial impact of counterfeit parts, the impact can be significant, for example at least in terms of lost sales. It is not unusual for manufacturers and distributors, as well as suppliers, to sell replacement components parts that may not be authorized, due to increasing competitive pressures that are often driven by cost. This is a common problem for businesses dealing in serviceable or replaceable parts and components, such as for example in protected systems including but not limited to systems of an engines. Therefore, a need exists to discourage customer acceptance of will-fit, reconditioned, and counterfeit product components and prevent or at least minimize against the impact of such activity.

Also, in the case of users of these products, will-fit, unauthorized reconditioned, and counterfeit products often fail to meet original equipment manufacturer specifications. As a result, equipment may fail prematurely or fail to operate as designed. Thus, users of non-genuine or inappropriate products may suffer from lesser quality and/or lesser performing products. Thus, improvements can be made to detect such non-genuine or inappropriate products.

In the example of engines, in order to ensure reliable, robust operation, engines must be protected from contaminants carried by engine fluids, such as for example fuel, oil/lube, air, coolant, etc. This is accomplished by filtering such fluids. Use of a non-genuine filter may present risks of using a filter that is of lesser quality, such as for example a filter that may not provide adequate filtration, that is prone to plugging, or that otherwise does not meet specifications and provides an operator/user with a false sense of security while the engine is damaged. It is desirable to ensure that an appropriate filter has been installed so as to avoid use of inappropriate filters, such as those that do not provide adequate filtration, are prone to plugging, or simply poor quality, and can provide the operator with a false sense of security while the engine is damaged. Thus, it is also desirable for the operational health of the engine to ensure that a genuine filter has been installed and to otherwise highlight detection of a non-genuine filter so as to reduce such risks. Improvements may be made upon existing filter designs so as to identify whether an appropriate filter has been installed.

SUMMARY

Generally, an improved process, system, and component configuration is described that discourages customer acceptance/use of will-fit, reconditioned, and counterfeit product components, by determining whether or not a serviceable product component is genuine, and if it is not, then appropriate action may be taken to warn operators and document such findings. Such an improved process, system, and component configuration can also help to improve a protected system's life and reduce its chance of failure, by detecting whether a serviceable component is genuine.

Generally, a serviceable product component can be detected as either genuine or potentially non-genuine by using a sensor based configuration to detect a marker or characteristic of the component that has information to indicate that the component is genuine.

The process, system, and component configuration described herein can be useful in various applications, such as for example in systems that have serviceable parts, for instance in the detection of genuine components of protected systems, including but not limited to fluid filters of a filtration system in an engine. In the example of the serviceable (or replaceable) product component being a fluid filter, such filters may be used for instance in liquid filtration systems including, but not limited to for example, lubrication, fuel, coolant, hydraulic, or liquid urea. Such filters may also be employed in filtration systems that do not filter liquids including, but not limited to for example, systems that filter diesel exhaust fluids, crankcase ventilation, and intake air.

It will be appreciated that the methodologies, systems, component configurations herein may be useful and applicable in filtration applications other than those mentioned above, and where there may be a general need to detect and help ensure that an appropriate filter is installed.

More generally, the methodologies, systems, component configurations herein may be useful and applicable for serviceable product components that are not filters, but where there may be a general need to detect and help ensure that a genuine serviceable product component is installed.

Appropriate market and/or operational circumstances may dictate that there is a specific family of serviceable components or products, such as but not limited to a fluid filter product, that is desired for tracking genuineness. Such a specific filter product or family of products is intended to be the "genuine filter" or "genuine product". In the example of fluid filters, inappropriate or non-genuine filters can include a will-fit filter that superficially resembles the genuine filter. Some will-fit filters may go so far as to copy features of the genuine product that are protected by patents or trademarks, violating rights that may be enjoyed by the owner of the genuine filter. Another type of inappropriate filter is a cross filter that can be installed in lieu of a genuine filter, but lacks the performance characteristics of the genuine filter. Regardless of whether an inappropriate filter is a will-fit or cross filter, typically there are real, physical, structural, or material differences between an inappropriate filter and a genuine filter. Any of such differences can be used to identify the fluid filter as genuine, where it can be detected as genuine such as at installation or during operation.

It will be appreciated that the methodologies, systems, component configurations herein are not limited to fluid filters. Other serviceable product components that are not filters may also possess such physical, structural, or material differences that differentiate them from non-genuine components, and which can be used to identify them as genuine. When such differences are inadequate to differentiate between genuine and inappropriate filters, genuine filters can also be labeled or provided with a marker to distinguish it from a non-genuine product. Likewise, it would be appreciated that other serviceable product components that are not filters may also be differentiated using such a marker.

As above, in some cases, the product component is a fluid filter. In one embodiment, an apparatus for detecting the presence of a genuine fluid filter apparatus includes a fluid filter that has a media that filters fluid therethrough and a targeted feature possessing at least one or more of a unique marker and/or design characteristic. The targeted feature is disposed on the fluid filter and may be a part or characteristic of its inherent structure. Also, a sensor is configured to detect the targeted feature. The sensor is configured to obtain information that is within or otherwise characteristic of the targeted feature, and the sensor can create an output based on the information.

In one embodiment, the fluid filter can be part of a system that includes an electronic control module. The electronic control module is configured to receive the output with the information from the sensor, and compare the information to one or more expected values. The electronic control module is configured to determine whether the fluid filter is genuine based on the comparison, and if the fluid filter is not genuine, is configured to perform any one or more the following: (1) generate and log a fault code, (2) inform of potential functional consequences of installing a non-genuine fluid filter, and (3) report to a party potential of unauthorized use.

In one particular embodiment, the serviceable product component is a filter apparatus employing a surface acoustic wave (SAW) sensor. Generally, an improved filter apparatus is described herein that has a surface acoustic wave (SAW) sensor. In some instances, the filter apparatus is a serviceable product component that has a SAW sensor incorporated on a surface thereof. The SAW sensor provides filter detection capability and is readable by a transmitter that obtains a response from the SAW sensor used to detect whether the filter installed is appropriate. The filter apparatus can be part of a system and methodology that detects whether an appropriate filter has been installed.

Generally, the SAW sensor is incorporated into or onto a part of the filter apparatus. In some instances the filter apparatus includes a serviceable product component. For example, the SAW sensor is disposed into or onto a filter cartridge, such as for instance a filter cartridge that is a serviceable product component of the filter apparatus which may be connected to a filter head. In other examples, the filter apparatus itself is an entirely serviceable product component, such as for instance a spin-on type filter, in which case the SAW sensor may be disposed into or onto any suitable part of the filter apparatus. It will be appreciated that the SAW sensor may be disposed into or onto a more permanent component, such as but not limited to a filter head to which the fluid filter connects.

In one embodiment, a filter apparatus includes a fluid filter. The fluid filter has a media that filters fluid therethrough. A surface acoustic wave (SAW) sensor is disposed on a portion of the fluid filter. The SAW sensor is readable so as to produce a response which indicates whether the fluid filter is an appropriate filter for use.

In one embodiment, a system for detecting the presence of an appropriate filter includes a fluid filter with a SAW sensor disposed on the fluid filter. A reader is configured to interrogate the SAW sensor and obtain a response from the SAW sensor. The response indicates whether the fluid filter is an appropriate filter for use.

In one embodiment, a method for detecting the presence of an appropriate filter includes sending an interrogation signal from a reader toward a fluid filter. The reader is configured to obtain certain data from a SAW sensor, where the data corresponds to an appropriate response indicating that the fluid filter is an appropriate filter for use. A determination is made as to whether an appropriate response has been received as a result of sending the interrogation signal, such that when the data is received, an appropriate response has been received, and when the data is not received an inappropriate response or no response would indicate that the fluid filter is not appropriate for use. In some embodiments, if there is an inappropriate response or no response, a warning is provided to indicate that the fluid filter is inappropriate for use.

In some embodiments, the response provided by a SAW sensor can include, but is not limited to, a surface acoustic wave resulting from a surface condition or a surface feature on a substrate of the sensor. For example, the surface feature can be a unique physical feature on a surface of the substrate which helps to identify the sensor, and thereby the fluid filter.

In other examples, the SAW sensor can also provide data on any one or more of fluid pressure, pressure drop, temperature, and/or chemical composition of a fluid. In such examples, the sensor may be mounted for example on a filter head or in another suitable location that may be more permanent, and not attached to the fluid filter. It will also be appreciated that the sensor may also be attached to the fluid filter.

In other embodiments, the methodologies, systems, component configurations can include additional capabilities and checks in the detection and determination of whether a serviceable product component is genuine.

In one embodiment, a method of detecting the presence of a genuine serviceable product component in an engine includes detecting, with an interface module, information from a serviceable product component, and receiving, with an electronic control module, the information detected from the interface module. A determination is made as to whether the product component is genuine based on the information received from the interface module. Such a determination is made by use of an identity module that has an identity component and a status of use component, where the information contained therein is configured to indicate that the product component is genuine.

More particularly, if the information detected by the interface module is verified by the electronic control module as being from the correct identity module, the product component is deemed genuine. In many embodiments, the identity module is disposed on the product component and has the identity component and status of use component within the identity module.

But if the information detected by the interface module is determined by the electronic control module as being from an invalid identity module, the product component is deemed as a suspect. Also, if no information is detected by the interface module, the electronic control module deems the product component as a suspect.

Generally, the concepts herein may be part of a system for detecting the presence of a genuine serviceable product component. In one embodiment, such a system for detecting the presence of a genuine product component includes a product component targeted for genuine component detection, an electronic control module, and an identity module disposed on the product component. The identity module includes an identity component and a status of use component. Also an interface module is configured to allow communication between the identity module and the electronic control module. The electronic control module is configured to determine whether the product component is genuine based on the information detected from the identity component and the status of use component.

In some embodiments, the product component for genuine detection may be a fluid filter as mentioned above, where in some embodiments, the identity module above includes the targeted feature possessing at least one or more of a unique marker and/or design characteristic, and the interface module above includes a sensor.

DETAILED DESCRIPTION

Generally, a process, system, and component configuration is described that discourages customer acceptance/use of will-fit, reconditioned, and counterfeit product components, by determining whether or not a serviceable product component is a genuine product component. If a component is determined to not be genuine after detection, then appropriate action may be taken to warn operators and document such findings. Generally, a serviceable product component can be detected as either a genuine component or a potentially non-genuine component by using configuration of a marker or characteristic of the component and a sensor to detect them. Such detection capability can also help to improve a protected system's life and reduce its chance of failure, by detecting whether a serviceable component of such a protected system is genuine.

Figure 1:
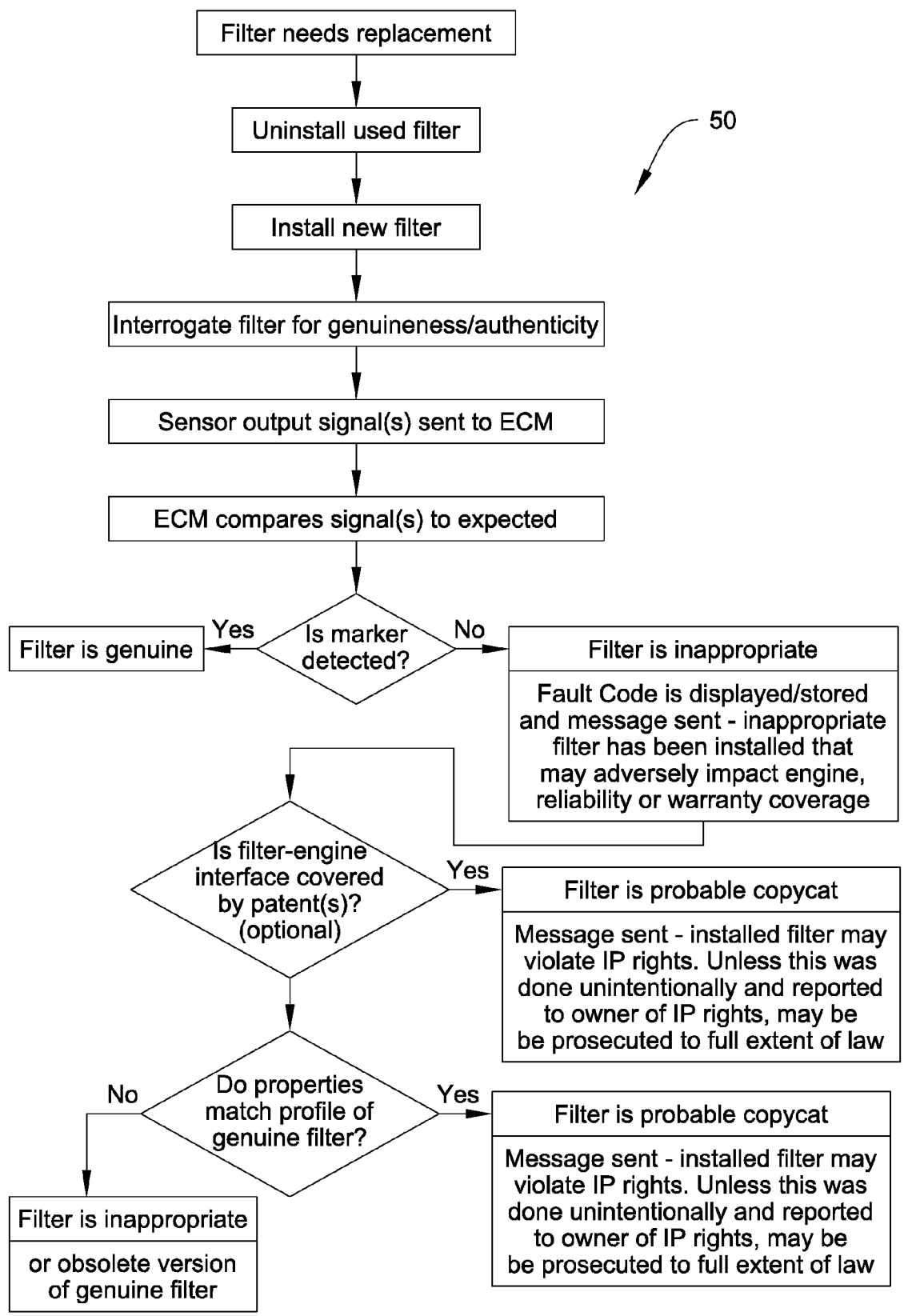
FIG. 1 is a flowchart of a process for detection, analysis, and reporting installation of a genuine or inappropriate replaceable product component, where the component is a fluid filter.
Figure 2:
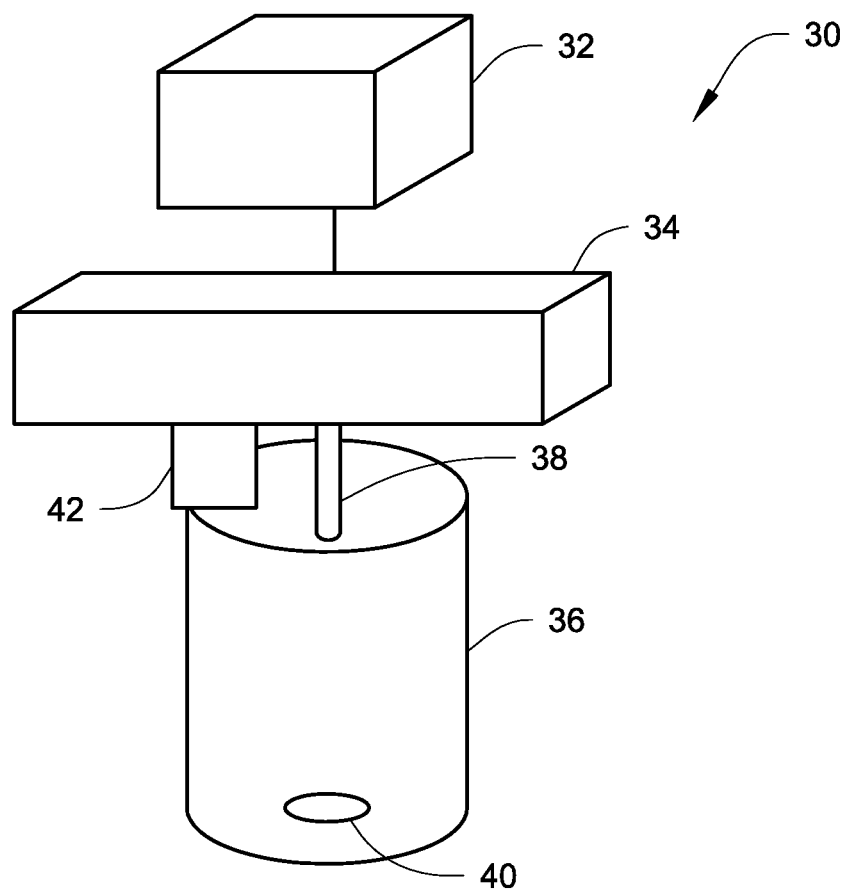
FIG. 2 is one embodiment of a replaceable product component being a fluid filter that employs the detection/identification capability.

FIGS. 1 and 2 show an embodiment of a method 50 for determining whether a genuine replaceable product component is present, wherein the serviceable component that is used in a system 30 to determine whether a fluid filter is genuine or non-genuine. Generally, the methodology, system, and devices herein can distinguish between genuine and non-genuine or inappropriate fluid filters and allow an appropriate party to be informed of actions, such as an attempt to use a non-genuine fluid filter.

As described above, appropriate market and/or operational circumstances may dictate that there is a specific family of serviceable components or products, such as a fluid filter product, that is desired for tracking genuineness. Such a specific filter product or family of products is intended to be the "genuine filter" or "genuine product". In the example of fluid filters, inappropriate or non-genuine filters can include a will-fit filter that superficially resembles the genuine filter. Some will-fit filters may go so far as to copy features of the genuine product that are protected by patents or trademarks, violating rights that may be enjoyed by the owner of the genuine filter. Another type of inappropriate filter is a cross filter that can be installed in lieu of a genuine filter, but lacks the performance characteristics of the genuine filter. Regardless of whether an inappropriate filter is a will-fit or cross filter, typically there are real, physical, structural, or material differences between an inappropriate filter and a genuine filter. Any of such differences can be used to identify the fluid filter as genuine, where it can be detected as genuine such as at installation or during operation. It will be appreciated that this is not limited to fluid filters. Other serviceable product components that are not filters may also possess such physical, structural, or material differences that differentiate them from non-genuine components, and which can be used to identify them as genuine. When such differences are inadequate to differentiate between genuine and inappropriate filters, genuine filters can also be labeled or provided with a marker to distinguish it from a non-genuine product. Likewise, it would be appreciated that other serviceable product components that are not filters may also differentiated using such a marker.

It will be appreciated that by serviceable product component, included within this application are product components such as those that are replaceable parts of an assembly and/or system, for example a protected system, such as but not limited to systems of an engine. A serviceable product component may contain either or both durable components, for example a fuel injector that must be serviced such as by being replaced or reconditioned at the end of their useful life, and consumable components, for example an oil filter that must be replaced periodically in the normal course of maintaining the product.

With further reference to fluid filters, the use of inappropriate fluid filters is a problem for engine owners, engine manufacturers, and filter suppliers. The use of inappropriate filters may reduce the life of critical engine components or fluids resulting in engine failure, downtime and increased costs for engine repairs for the engine owner. For the engine manufacturer, this may lead to increases in warranty claims and a misperception of unreliability of the engine. For filter manufacturers, such inappropriate or will-fit filter products reduce filter aftermarket sales and profits, and, in some cases, can adversely impact the strength of the brand name, as the poor performance of inferior products is wrongly attributed to the genuine product. In cases where genuine products contain patented technology or are covered by trademarks, there also may be violations of intellectual property laws.

With reference to FIGS. 1 and 2, a method 50 and system 30 are described that employs the general concepts above and can address such issues discussed above. The system 30 (shown in FIG. 2) includes a unique fluid filter 36, a sensor 38 capable of detecting the presence of the fluid filter 36. An electronic control module (ECM) 32 is provided that accepts a signal generated by the sensor 38, where the signal may be via wireless or wired transmission. It will be appreciated that appropriate reader technology may be employed and suitably adapted to obtain and transmit an output generated by the sensor 38 to the ECM 32. Readers are well known and not further described. The ECM 32 is configured to use the response from the sensor 38 to determine whether or not the fluid filter 36 installed is a correct and genuine fluid filter.

If the fluid filter is not genuine, the ECM 32 is configured to produces a fault code or indication. Such an indication or fault code can include any one or more of the following: (1) that an inappropriate fluid filter has been installed, (2) the fluid filter installed may adversely affect engine operation, reliability and/or warranty coverage, (3) the fluid filter may violate a patent, a trademark or otherwise be a pirated product and/or (4) warn an individual to contact the appropriate party in a designated manner, for example if use of the incorrect, defective, non-genuine, or unauthorized fluid filter is unintentional.

More generally, a genuine fluid filter e.g. 36 would possess one or more of a unique marker or a design characteristic (or both) 40 on the fluid filter 36. The sensor 38 is configured to detect the unique marker or characteristic 40. As shown in the embodiment of FIG. 2, the unique marker or characteristic 40 is disposed somewhere on or within the fluid filter 36. Also, in the embodiment of FIG. 2, the sensor 38 is disposed with and a part of a mechanical interface 42 that connects the fluid filter 36 to a filter connector 34. In many circumstances, but not necessarily all situations, the filter connector 34 is a fixed component, such as for example on the engine or product system, and may include for example a filter head, filter housing, or filter module or other filter mounting component. It will be appreciated that the mechanical interface 42 is formed by the fluid filter 36 mating with the filter connector 34. It will be appreciated that the mechanical interface 42 is functionally shared by the filter connector 34 and fluid filter 36. As one example, the filter connector 34 can include a valve that can be opened by a structure on the fluid filter 36, such as but not limited to a pin. Other arrangements and constructions may be employed, and the mechanical interface is intended to be non-limiting so long as it allows the fluid filter 36 to mate with the filter connector 34. The sensor 38 is also configured to detect a specially targeted characteristic or marked feature 40 (further described below) of the fluid filter 36 to determine if it is genuine. The sensor 38 has an output that is sent to the ECM 32 to compare to expected values. As described above, reader may be employed to transmit the output of the sensor 38 to the ECM 32. If fluid filter 36 is not genuine, the ECM can be configured to for example: (1) generate and log a fault code; (2) inform on potential functional and/or legal consequences; and/or (3) provide information to report on potential patent/trademark violations.

With reference to FIG. 1, a flowchart shows a process 50 for detection, analysis, and reporting installation of genuine or inappropriate filters. FIG. 1 uses a flowchart to show how genuine, inappropriate and potential will-fit filters are detected and the nature of the fault passed on to operators, service, and/or field personnel if a non-genuine filter is installed. FIG. 2 schematically illustrates one embodiment of a system 30 with components that are configured to perform the process 50. In many cases, the detection process is done as soon as a filter is installed and before it is used for an appreciable period of time, in order to enable field personnel to correct accidental (or intentional) installation of non-genuine filters before any damage is done to the engine. In many circumstances, the detection process is done before the filter is filled with fluid for liquid filters, in order to maximize the ability of the genuine filter detection sensor to distinguish between genuine and non-genuine filters.

In general, the genuine fluid filter generally possesses a distinguishing marker or characteristic that can be a targeted feature which is used to distinguish it from inappropriate filter (e.g. 40 in FIG. 2), and that can be detected by a sensor (e.g. 38 in FIG. 2).

With further reference to the targeted feature, genuine filters in some embodiments are specifically marked in a manner that does not otherwise detract from the performance of the fluid filter. In some cases, the special marking (e.g. 40 in FIG. 2) can include but is not limited to inclusion of a RFID or a surface acoustic wave (SAW) tag generally within or on the fluid filter, including for example on or within one or both of the filter element endcaps. Other examples can include a bar code somewhere on the fluid filter, incorporation of a resistor or other electrical, magnetic or chemical means of marking somewhere on or within the genuine fluid filter.

The function of the marker is generally to identify genuine filters. The marker may be configured as a subcomponent of the filter or a cosmetic feature that can be detected by the sensor. The purpose of the marker is to identify the filter as genuine and as a product that meets the full specifications of the application for which it is intended.

In another embodiment, the targeted feature may be a distinguishing characteristic (e.g. 40 in FIG. 2) that is a structure or part of the genuine filter itself. Often, genuine and inappropriate filters differ structurally and in the materials used. Inexpensive will-fit filters, in particular, typically utilize less expensive components and materials. While an in-depth examination and comparison of will-fit and genuine filters can reveal these differences, such examination is usually impractical or impossible in the field. However, these differences may manifest themselves in terms of easy to ascertain differences, such as for example in the mass of the filter, the vibration spectrum of the fluid filter, or the flow and pressure characteristics of the fluid filter. These structural and material differences may be deduced by appropriate sensing technology and can be used to differentiate between genuine and inappropriate filters in addition to or without the need for an explicit marker (e.g. RFID, SAW, barcode, resistor, etc.). In appropriate circumstances, this approach may be particularly useful for detecting a filter that does not meet the full specification of the application. It will be appreciated that such an approach may be used as an alternative to the marker approach or to complement it.

As referenced above, the genuine filter may or may not possess patented or trademarked features. If it does, the methodology and system herein not only can be implemented to distinguish between genuine and inappropriate filters, but also can optionally be employed for detecting potential patent or trademark infringement. See the process 50 at the bottom of the flow chart in FIG. 1.

In one example, if a patent exists for genuine filter, such as for example, a patent that covers the manner in which the filter or filter element interfaces with the filter head, housing, or mounting, for instance to enable the genuine filter to function properly on the engine, then a fluid filter which contains the patented feature may still be a suspect (i.e. inappropriate product) even though it may be installed and function as an appropriate fluid filter (i.e. authorized, non-infringing product). Thus, with further reference to FIG. 1, if the genuine filter has a patented feature(s) and the new filter does not contain the marker or characteristic, there is a good reason to suspect that the new filter is an infringing will-fit filter.

Likewise, if the genuine filter does not have a feature covered by a patent and the new filter does not contain the marker, but includes the marker or the structural or material characteristic, there may still be reason to suspect that a new filter is at least possibly an inappropriate filter or obsolete version of the genuine filter. Generally, if such markers or structural/material characteristics are used to differentiate genuine filter products, those filters with the targeted feature specially marked would be assumed to be genuine, where those without it are assumed to be inappropriate.

As referenced above, there are a number of ways to mark and detect genuine filters. For example, the detection capabilities disclosed by U.S. Pat. Nos. 6,533,926, 6,537,444, and 6,711,524 may be suitably adapted for use in the systems, methodologies, and component configurations to detect genuine filters in this application. Other ways to mark and detect genuine filters, including but not limited to resistivity, magnetic, chemical, RFID, bar code, color, shape, dielectric constant, or combinations, may also be used. However, it will be appreciated that any type of marker which is not normally found in or on a filter and that can be detected by a sensor of some type, whether passively or actively, may be adapted for use with the concepts herein.

In some embodiments, a passive device may be used in which the filter possesses a marker which is simply detected upon installation of a genuine filter. Such a passive device can include for example, a proprietary mechanical interface that is marked, where upon connection of the filter, the sensor simply detects the presence of the marker. A reader as described above can be employed to obtain the information detected by the sensor and transmit it to the ECM. In other embodiments, an active device is one in which the sensor can interrogate the filter by supplying a voltage, current, radio frequency, vibration, light or other source of energy, and detects a response from the filter. For a fluid filter employing a marker, the marker is usually not an inherent feature of the genuine filter (e.g. geometry, materials, mass, flow characteristics, etc.), but an addition made to distinguish it from inappropriate filters. While U.S. Pat. Nos. 6,533,926; 6,537,444; and 6,711,524 have described means of labeling filters in a manner that a specially equipped engine could obtain information about service interval, etc., such devices described do not employ such information in a system or methodology to detect if the wrong type of filter were used.

As also described above, it will be appreciated that there are also a number of structural or material means to detect genuine filters. Typically, these are active means, in which energy, such as vibration, an electric current or field, magnetic field, acoustic, radiation, etc., is applied to the filter by an appropriate source or transmitter. In appropriate circumstances, the response of the filter to the energy source, e.g., its vibration spectrum, frequency or amplitude shift, etc., is observed by one or more sensors and used by the ECM to determine whether or not the new filter is genuine. For example, applying an excitation force, acoustic or vibration pulse to the filter element could induce a vibration spectrum characteristic of the element. The characteristics of the spectrum are a function of how individual subcomponents of the filter element are coupled to the source, which in turn is a function of the materials used to make the element, the dimensions and shapes of the subcomponents, and how they are assembled. Thus, the vibration spectrum for a given excitation differs between different filter design and the design choices made.

When employing structural or material means to detect genuine filters, it will be appreciated that an appropriate sensor (e.g. 38 in FIG. 2) may be used to detect or measure the marker or structural/material characteristics (e.g. 40 in FIG. 2) of the installed filter (e.g. 36 in FIG. 2) and to transmit a signal to the engine control module (e.g. 32 in FIG. 2). The properties of the signal correspond to the measured/detected characteristics of the new filter. In some cases, a reference sensor or algorithms may be needed to normalize the data or filter out environmental effects (e.g., temperature). Examples of sensors to detect markers have already been discussed above. One of skill in the art would know how to apply various acoustic and vibration spectral analysis methods, acoustic wave technologies, and/or electrical and magnetic tomographic techniques for use in the methodology and system herein, and which can be well-suited for detecting design, structural and material differences between filter products.

With further reference to FIG. 1 and the ECM (e.g. 32 in FIG. 2), it will be appreciated that the ECM is configured to accept the signal from the sensor and uses it to determine whether or not a genuine filter was installed. An algorithm is used to compare the detected/measure value to an expected range of values for genuine filters. If the new filter is determined to be genuine, it is noted in the ECM log/history. If not, a fault code is generated to be logged by the ECM and a message displayed indicating that an inappropriate filter was installed. The flow chart and, decision tree of FIG. 1 shows one embodiment of a system using a single marker-type sensor for duel detection, such as first detecting whether the fluid filter is genuine and then if the fluid filter is not genuine, whether such non-genuine or inappropriate fluid filter may violate an intellectual property right. It will be appreciated that as described above, the sensor and target feature configuration for detecting a design, structural, and/or material characteristic may also be incorporated into the structure of the mechanical interface between the filter (having the marker e.g. 40) and the filter connector (having the sensor e.g. 38), which may be a filter housing, head, mounting module. It also will be appreciated that the sensor (e.g. 38) and target feature (e.g. 40) may together be incorporated into the fluid filter (e.g. 36), rather than as components respective to the filter/connector interface. The sensor and target feature may be contained as a unitary element.

With further reference to FIG. 1, the "Message sent" also refers to an intellectual property (IP) warning associated with inappropriate filters that appear to be genuine. This may be applicable if the genuine filter contains patented technology that could be detected in this manner. For example, where a fluid filter has a correct proprietary interface but lacks a marker (e.g. 40), such a fluid filter may be a counterfeit filter. FIG. 1 shows an optional "Message sent" where the fluid filter has a physical/mechanical filter-engine interface that is proprietary and/or has the benefit of an IP right, e.g. a patent. The physical/mechanical filter-engine interface can also be used as another targeted feature, and can be detected, e.g. by the ECM, to make a determination on whether to send an IP warning. In some cases, the IP warning may include, but is not limited to, a phone number, Email address, website, or other contact information to enable operators, service and/or field personnel of potentially infringing products to contact another party, such as the owner, authorized user of the IP rights or the agent thereof, and inform them of potential infringement. In some circumstances, the IP warning can be directed to one that is not in the field, such as the owner of the IP rights, a manufacturer, a distributor, or a licensed user of the IP rights. In some circumstances, the IP warning can include information that would list the patent numbers that cover or potentially cover the product and/or provide evidence of willful infringement in an enforcement action.

FIGS. 3-17—Exemplary Embodiments of Serviceable Product Component Being a Fluid Filter and Employing Surface Acoustic Wave (SAW) Sensor FIGS. 3-17 show various embodiments of a fluid filter using a SAW sensor for detection of the fluid filter. The detection systems, methodologies, and component configurations herein may suitably employ the SAW sensor configurations described below and illustrated in FIGS. 3-17. It will be appreciated that the fluid filter apparatus of FIGS. 3-17 may employ the concepts and implementations described above with respect to FIGS. 1 and 2. Generally, the serviceable product component, which is a fluid filter apparatus as shown in FIGS. 3-17, can be detected as either a genuine component or a potentially non-genuine component. Similarly, this is done by using a targeted feature such as a product characteristic or marker to identify the serviceable product component as genuine, and using a way to detect the characteristic or marker and relay the information detected. Such detection capability can also help to improve a protected system's life and reduce its chance of failure, by detecting whether a serviceable component of such a protected system is genuine.

Turning to the FIGS. 3-17, exemplary embodiments of a filter apparatus and filter system employing a surface acoustic wave (SAW) sensor are illustrated by FIGS. 3-9 and described in the following detailed description. Generally, an improved filter apparatus is described herein that has a surface acoustic wave (SAW) sensor. Such a sensor is used to tag a fluid filter, thus enabling an end user to confirm whether an appropriate filter has been installed, such as for example filters used for filtration of e.g. fuel, oil, coolant, air, crankcase ventilation, or hydraulic. Acting upon the information provided by the SAW sensor, an end user can take appropriate action to ensure that the equipment continues to operate reliability and to avoid premature failure.

Generally, the filter apparatus includes a serviceable product component that has a SAW sensor incorporated on a surface thereof. The SAW sensor provides filter detection capability and is readable by a transmitter that obtains a response from the SAW sensor used to detect whether the filter installed is appropriate. The filter apparatus can be part of a system and methodology that detects whether an appropriate filter has been installed. It will be appreciated that the SAW sensor may be disposed into or onto a more permanent component, such as but not limited to a filter head to which the fluid filter connects.

Figure 3:
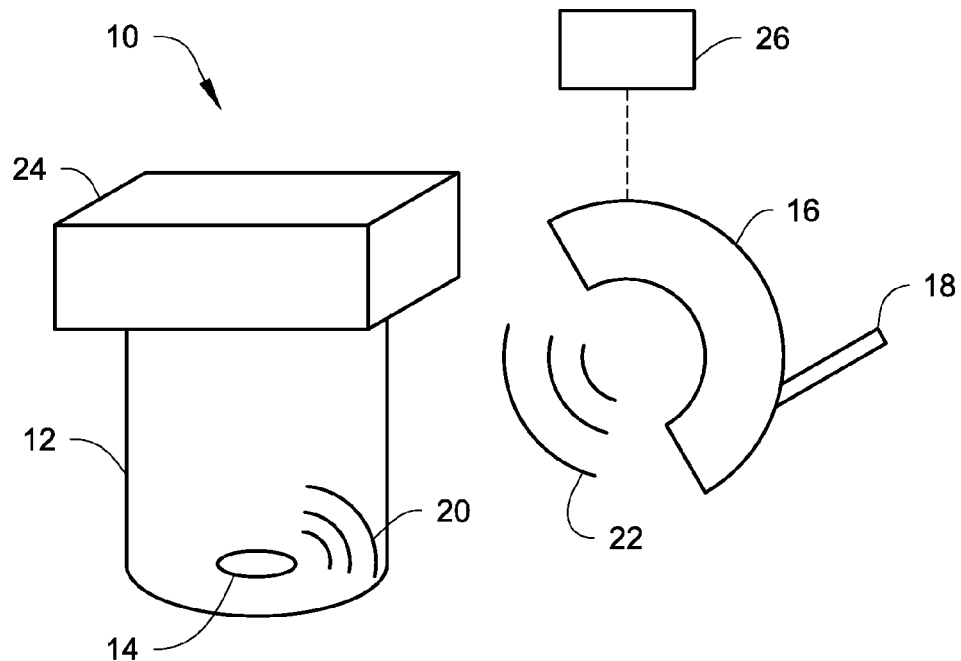
FIG. 3 is a schematic view of one embodiment of a system employing a replaceable product component that is a fluid filter with a surface acoustic wave sensor.

FIG. 3 is a schematic view of one embodiment of a system 10 employing a fluid filter 12 having a surface acoustic wave sensor 14. In the embodiment shown in FIG. 3, a filter apparatus includes the filter 12 and surface acoustic wave (SAW) sensor 14. It will be appreciated that the fluid filter 12 has a filter element with media that allows fluid to filter therethrough. The surface acoustic wave (SAW) sensor 14 is disposed on a portion of the fluid filter 12. The SAW sensor 14 is readable so as to produce a response which indicates whether the fluid filter is an appropriate filter for use.

Generally, the SAW sensors described herein can be incorporated into or onto a part of the filter apparatus that is a serviceable product component. In some examples, the SAW sensor is disposed into or onto a filter cartridge, such as for instance a filter cartridge that is a serviceable product component of the filter apparatus. In other examples, the filter apparatus itself is an entirely serviceable product component, such as for instance a spin-on type filter, in which case the SAW sensor may be disposed into or onto any suitable part of the filter apparatus. Examples of such exemplary alternatives are further described below with reference to FIGS. 4-9. It also will be appreciated that the SAW sensor may be disposed into or onto a more permanent component, rather than a serviceable product component, such as but not limited to a filter head to which the fluid filter connects.

With further reference to FIG. 3, the system 10 is for detecting the presence of an appropriate filter. FIG. 3 shows an example where the fluid filter 12 is an appropriate filter installed on the filter head 24. A reader 16 powered by a power source 18 is configured to interrogate the SAW sensor 14 using an interrogation signal 22 and obtain a response 20 from the SAW sensor 14. The response 20 indicates whether the fluid filter 12 is an appropriate filter for use. That is, based on the response 20 received by the reader, the system can determine whether the fluid filter 12 is an appropriate filter for use. A control unit 26 (e.g. an ECM) receives the response 20 from the reader 16 and references the response 20 against and known acceptable response in making the determination of whether the fluid filter is an appropriate one.

With further reference to SAW sensor technology, the sensor 14 is used to tag the fluid filter 12, thus enabling an end user to confirm whether an appropriate filter has been installed. The SAW sensor 14 can provide a RFID and communicate wirelessly with the reader 16.

SAW sensors function by converting an incoming radio wave received at an antenna of the SAW sensor to an acoustic wave on the surface of the sensor. In some embodiments, SAW sensors employ certain resonating materials with piezoelectric properties, such as but not limited to quartz or certain versions of lithium, that create a mechanical displacement when an electric field is applied. Sensing with acoustic waves is based on measuring variations of acoustic propagation velocity of the wave, or wave attenuation. Depending on how resonators are placed, the sensor can be sensitive to temperature or pressure. As an example only, the size of the sensor can be as small as 3 mm×3 mm.

The propagation of the acoustic pulse is affected by surface conditions on a substrate which cause reflections that are retransmitted back through the antenna to the reader 16. It will be appreciated that surface conditions can change due to such conditions as temperature, chemical adsorption and pressure changes. Reflections can also be caused by surface features intentionally added to the substrate for identification purposes. In some embodiments, the response provided by a SAW sensor can include, but is not limited to a surface acoustic wave resulting from a surface condition or surface feature of a substrate, which is part of the sensor. For example, the surface feature or condition can be a unique physical feature on the surface of the substrate which identifies the sensor. In some embodiments, the substrate is ceramic, but it will be appreciated that other materials may be employed which can provide the identifying surface acoustic wave response.

With reference to the reader 16, an antenna is connected to the reader 16, which in some embodiments is a wireless device. The reader 16 can be a relatively small unit mounted onto the filter head 26 that receives feedback from the sensor 14, for example at each service interval or in real time. In appropriate circumstances, real time is meant as any time that the reader 16 is powered or any time the engine is in operation. In some embodiments, the reader including antennae is mounted on the engine or in the engine compartment. It will be appreciated that there can be either multiple antennae or one antenna with multiple SAW sensors.

Since the acoustic velocities are much slower than the radio wave, the returning signal is separated sufficiently in time to be clearly detected. Advantages of the sensors employing SAW RFID are longer detection distances, faster response, higher temperature capability, and the ability to combine sensing with ID. As some example of the capability of SAW RFID, the temperature range capability can include about −40° C. to about 200° C., and higher in some cases, which such accuracy achieved as high, for example, as +/−1 degree ° C. or better. The SAW RFID can be used on products rotating at up to 5000 rpm. Another benefit is that such sensors can be miniaturized and wireless, and can be mounted in difficult to reach locations, which might have less clearance, for example, at a center of an engine near the bearings. SAW sensors can withstand high magnetic fields and large electrostatic voltages. Detection distances between the reader and the sensor can be as much as 4 meters where appropriate, and with update rates of up to about 2 kHz.

In the automotive underhood environment, for example, where temperature is a consideration SAW RFID is a suitable sensing technology. That is SAW RFID can be used in relatively harsh environments where other sensors may not be as suitable or be able to be used at all. For example, this technology can be used for high temperature environments such as may occur in an after treatment system. Further, it can be used to measure temperature at the bearings in the engine. Even further, it can be used in many high horsepower (HHP) or heavy duty (HD) applications in areas not able to be penetrated with other technologies. Typically, SAW sensors can handle multiple packaging schemes. The packages can be quite diverse depending on the application. The SAW sensor can be attached by a variety of ways including but not limited to potting, gluing, or mechanical affixing.

Also, since it is oftentimes sufficient to identify components, such as filters, by component type and not by individual serial number, SAW RFID would be able to provide enough information to verify correct type of component.

As described above, the response provided by a SAW sensor can include a surface acoustic wave resulting from a substrate, which may be a surface condition or a surface feature of a substrate on the sensor. The response is not limited to substrate surfaces alone. In other examples, the SAW sensor can also provide data on any one or more of fluid pressure, pressure drop, temperature, and/or chemical composition of a fluid. That is, an additional benefit of SAW RFID is the ability to combine wireless sensing of pressure or temperature or chemical composition, in addition to the identification function.

Referring back to FIG. 3, the basic components of the filter apparatus are the fluid filter 12 with SAW sensor 14. In use, the fluid filter 12 is mounted to a filter head 24. The reader 16 (transmitter) and its antenna may be located on the engine or other equipment, including for example anywhere in or near the engine compartment. The power source 18 powers the reader 16. It will be appreciated that the power source 18 may be powered by engine supplied DC and/or battery power. When the reader 16 sends out the interrogation radio frequency/signal 22, a response 20 will be produced (as previously described) and detected only if a filter with the corresponding SAW is present. That is, if no response is received or if a response is received that does not correspond with an acceptable signature response, the indication is that the fluid filter installed is an inappropriate fluid filter.

It will be appreciated that the reader 16 could interrogate the fluid filter 12 whenever service is performed on the engine (e.g., filter changes). It will also be appreciated that the reader 16 can interrogate the fluid filter 12 upon start up, at regular intervals, and/or continuously.

Filters lacking a SAW with the appropriate signature response characteristic(s) would fail to produce a response at all or fail to produce an identifiable response. In either case, this would be recognized by the reader 16 and an appropriate warning or error message be provided. In some embodiments, the reader 16 employs use of a control unit 26, such as an electronic control module ECM, which helps determine whether the response from the SAW sensor is acceptable and if the response is not acceptable to provide a message indicating the fluid filter is inappropriate. Examples of such a message include but are not limited to, logging a warning into the engine's data management system, a warning light, a fault code, derating of the engine or service interval, and/or other appropriate action or output to warn an end user.

With reference to FIGS. 4-9, some exemplary and non-limiting embodiments are illustrated as to the placement of the SAW sensor with respect to the fluid filter.

Figure 4:
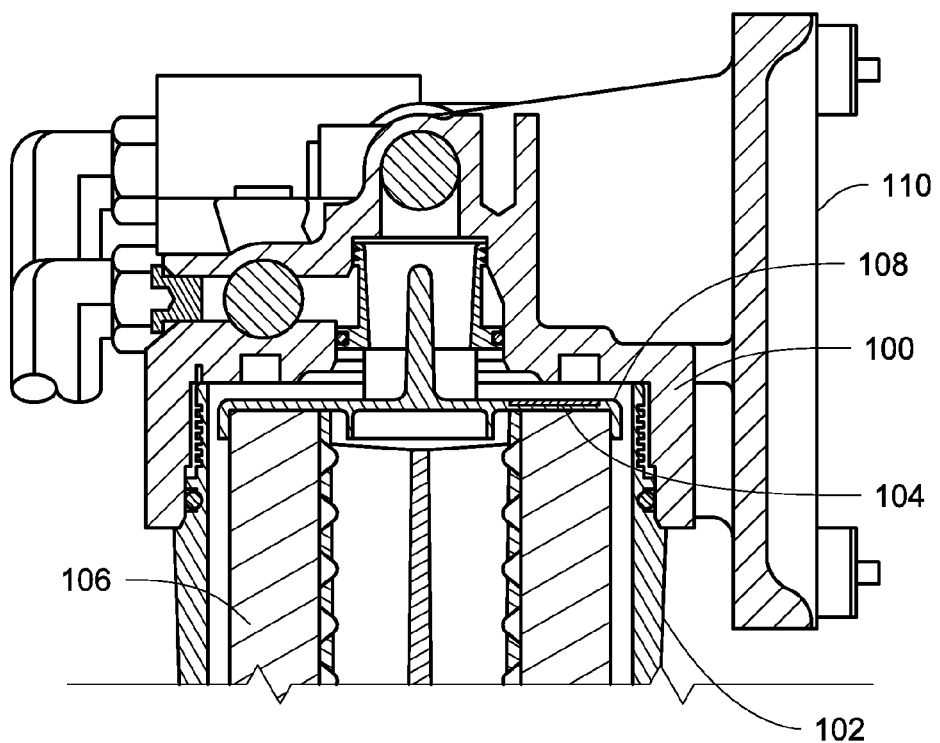
FIG. 4 is a partial sectional view of one embodiment of a replaceable product component that is fluid filter with a surface acoustic wave sensor embedded into a top endplate.

FIG. 4 is a partial sectional view of one embodiment of a filter apparatus 100 with a fluid filter 102 installed on a filter head 110. The filter apparatus 100 includes a fluid filter 102 with a filter cartridge therein. The filter cartridge has a media 106 for filtering fluid therethrough. A surface acoustic wave sensor 104 is located at a top endplate 108 of the filter cartridge. In the example shown, the SAW sensor 104 is incorporated into the top of the endplate 108. However it will be appreciated that it may be disposed at the bottom of the endplate or even entirely within the endplate, so long as it can receive a signal from a reader. The sensor 104 may be applied in a number of ways, such as for example, embedding or potting, such as but not limited to using plastisol, polyurethane or other suitable materials. See upper left of FIG. 4.

Figure 5:
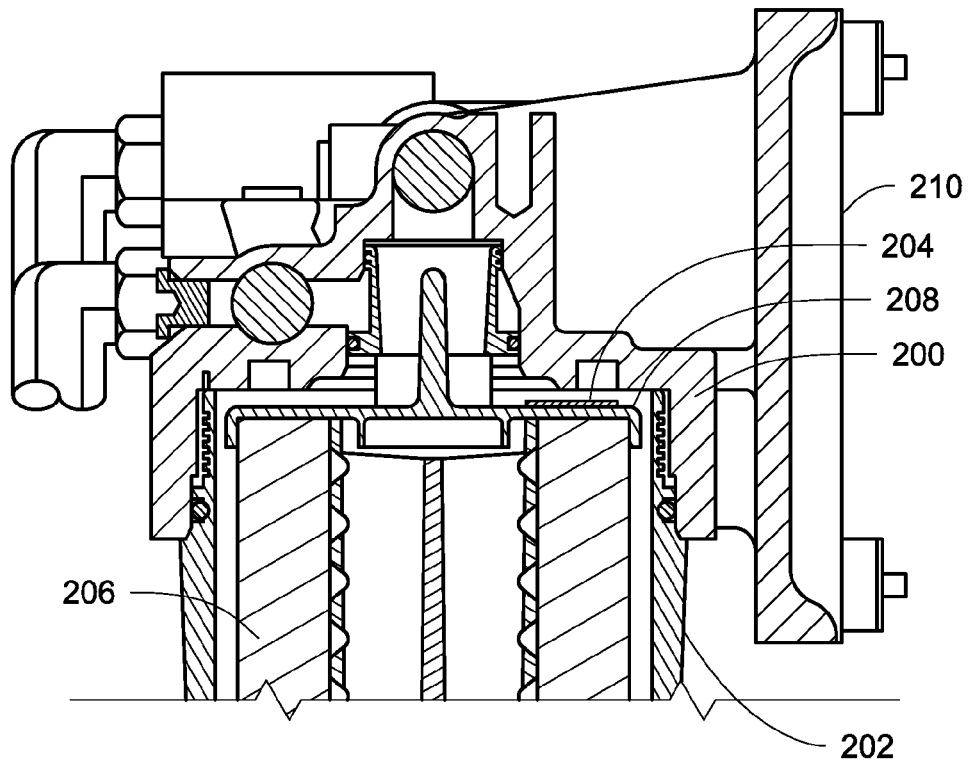
FIG. 5 is a partial sectional view of one embodiment of a replaceable product component that is fluid filter with a surface acoustic wave sensor located on a top endplate.

FIG. 5 is a partial sectional view of another embodiment of a filter apparatus 200 with a fluid filter 202 installed on a filter head 210. The filter apparatus 200 includes a fluid filter 202 with a filter cartridge therein. The filter cartridge has a media 206 for filtering fluid therethrough. A surface acoustic wave sensor 204 located on a top endplate of the filter cartridge. In the example shown, the SAW sensor 204 is attached on the top of the endplate 208. The sensor 204 may be applied via a number of ways, such as but not limited to use of an appropriate adhesive. See upper left of FIG. 5.

Figure 6:
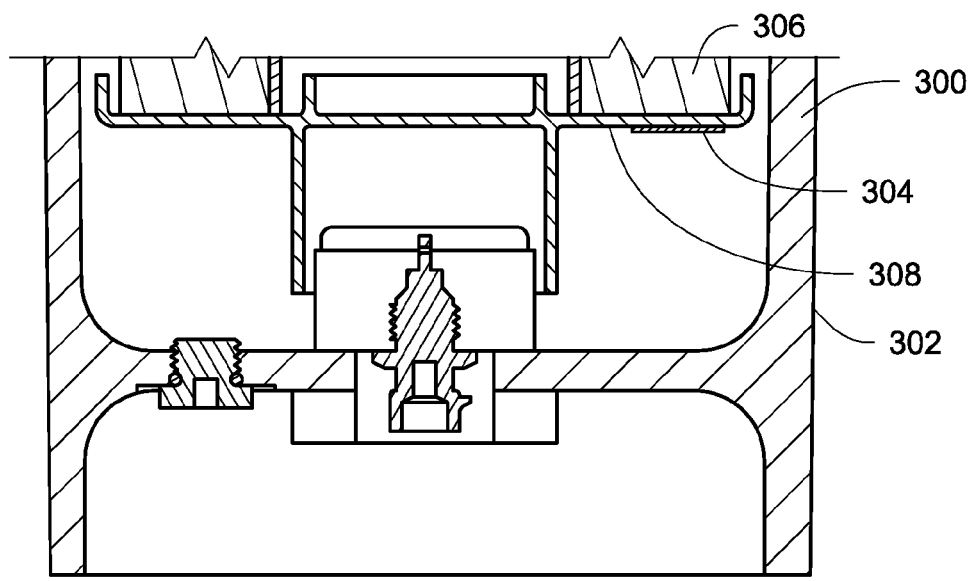
FIG. 6 is a partial sectional view of one embodiment of a replaceable product component that is fluid filter with a surface acoustic wave sensor located on a bottom endplate.

FIG. 6 is a partial sectional view of one embodiment of a filter apparatus 300. Although not shown, the filter apparatus 300 includes fluid filter 302 connected to a filter head as similarly shown in the earlier figures. The filter apparatus 300 includes a fluid filter 302 with a filter cartridge therein. The filter cartridge has a media 306 for filtering fluid therethrough. A surface acoustic wave sensor 304 is located on a bottom endplate 308 of the filter cartridge. In the embodiment shown, the SAW sensor 304 is attached to the bottom of the endplate 308. It will be appreciated that the sensor 304 may be applied on the endplate in a number ways, such as but not limited to, use of an appropriate adhesive. See upper left of FIG. 6. While not shown, the sensor 304 may also be embedded or potted in the bottom endplate 308 in a similar manner such as described with respect to FIG. 4.

Figure 7:
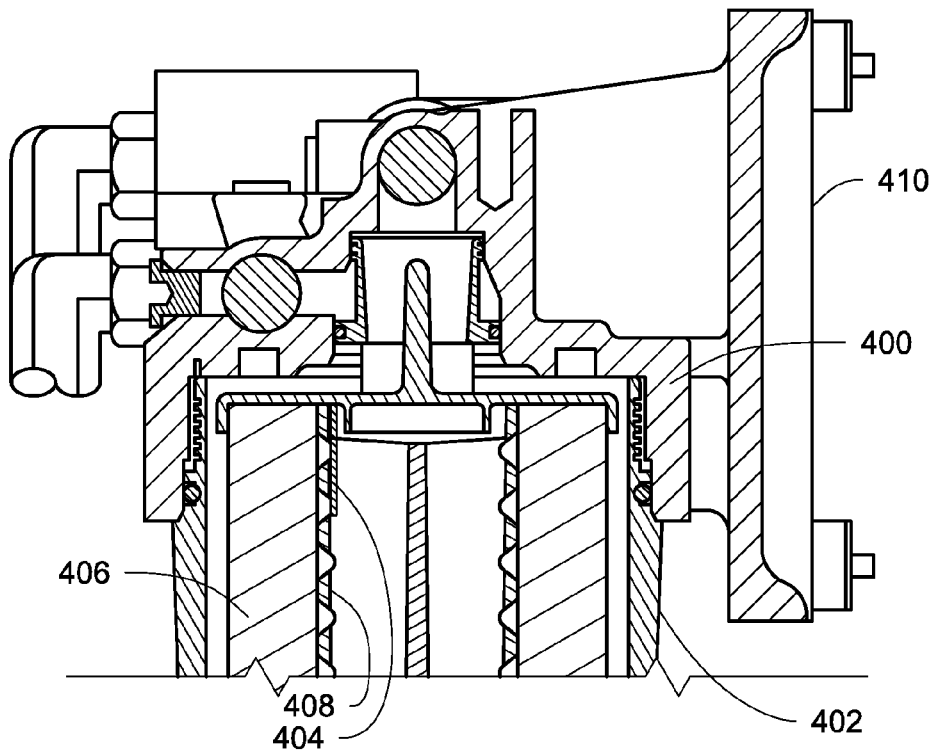
FIG. 7 is a partial sectional view of one embodiment of a replaceable product component that is fluid filter with a surface acoustic wave sensor located on a center tube.

FIG. 7 is a partial sectional view of one embodiment of a filter apparatus 400 with a fluid filter 402 installed on a filter head 410. The filter apparatus 400 includes a fluid filter 402 with a filter cartridge therein. The filter cartridge has a media 406 for filtering fluid therethrough. A surface acoustic wave sensor 404 is located on a center tube 408 of the filter cartridge. In the embodiment shown, the SAW sensor 404 is incorporated into or attached to the center tube 408. See middle of FIG. 7.

Figure 8:
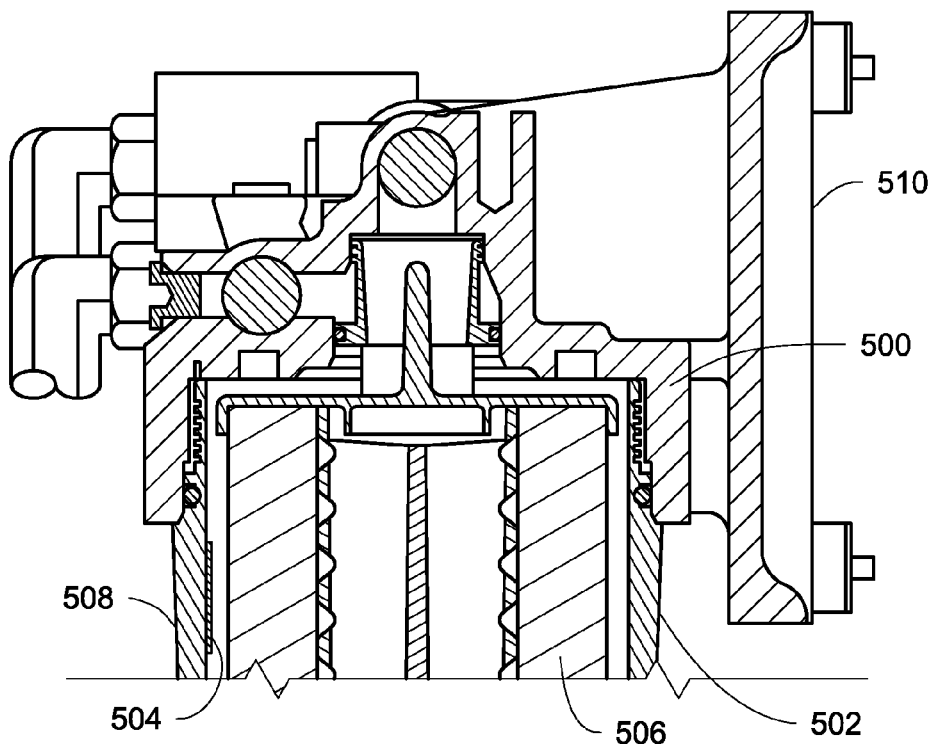
FIG. 8 is a partial sectional view of one embodiment of a replaceable product component that is fluid filter with a surface acoustic wave sensor on an inside of a housing.

FIG. 8 is a partial sectional view of one embodiment of a filter apparatus 500 with a fluid filter 502 installed on a filter head 510. The filter apparatus 500 includes a fluid filter 502 with a filter cartridge therein. The filter cartridge has a media 506 for filtering fluid therethrough. A surface acoustic wave sensor 504 is disposed on an inside of a housing 508 of the fluid filter 502. In the embodiment shown, the SAW sensor 504 is at the inside of the housing 508. See lower left of FIG. 8. It will be appreciated that in other examples, the SAW sensor may be incorporated into (e.g. embedded), attached on the outside of the housing, such as for example on spin-on type filters.

Figure 9:
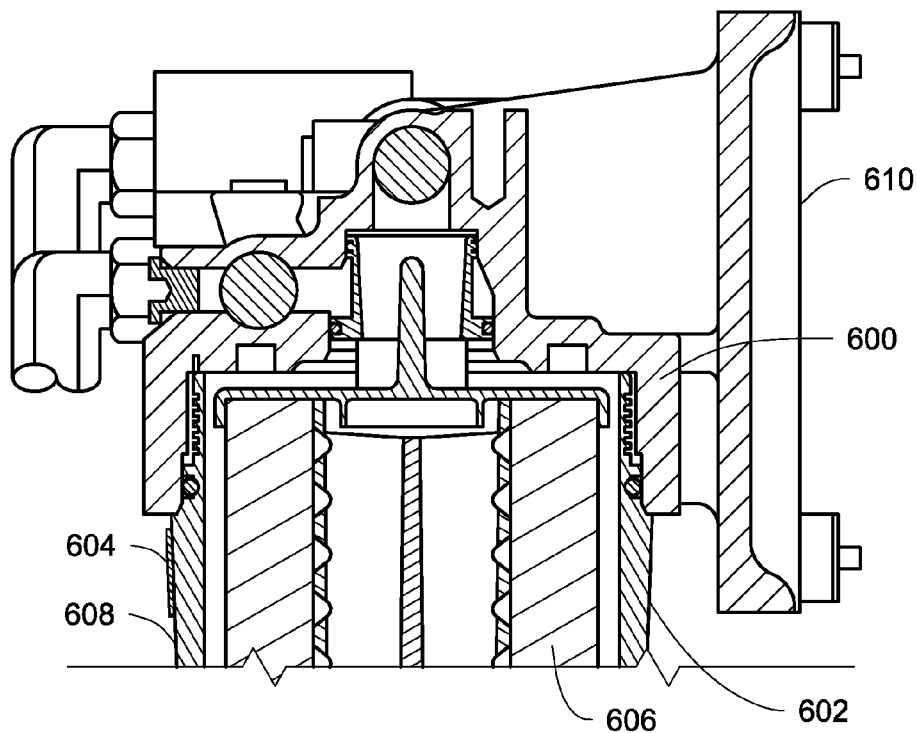
FIG. 9 is a partial sectional view of one embodiment of a replaceable product component that is fluid filter with a surface acoustic wave sensor on an outside of a housing.

FIG. 9 is a partial sectional view that shows one embodiment of a filter apparatus 600 with a fluid filter 602 installed on a filter head 610. The filter apparatus 600 includes a fluid filter 602 with a filter cartridge therein. The filter cartridge has a media 606 for filtering fluid therethrough. A surface acoustic wave sensor 604 is disposed on an outside of a housing 608 of the fluid filter 602. In the embodiment shown, the SAW sensor 604 is attached to an outside of the housing 608. See lower left of FIG. 9.

With reference to the materials of the filter apparatus and the SAW sensor, in some embodiments the housing or shell of the fluid filter is a composite material or plastic in the above embodiments. In appropriate circumstances, the SAW sensor described herein includes both a sensor component coupled to an antenna to communicate the detected response.

Figure 10:
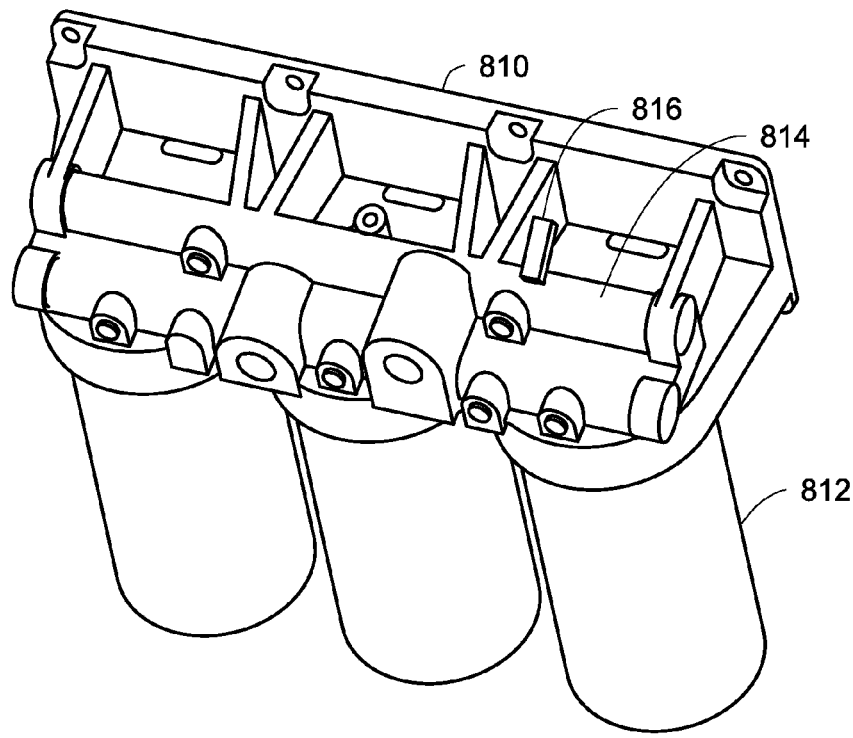
FIG. 10 is a top perspective view showing an embodiment of a reader for interrogating a surface acoustic wave sensor, where the reader is on a filter head.
Figure 11:
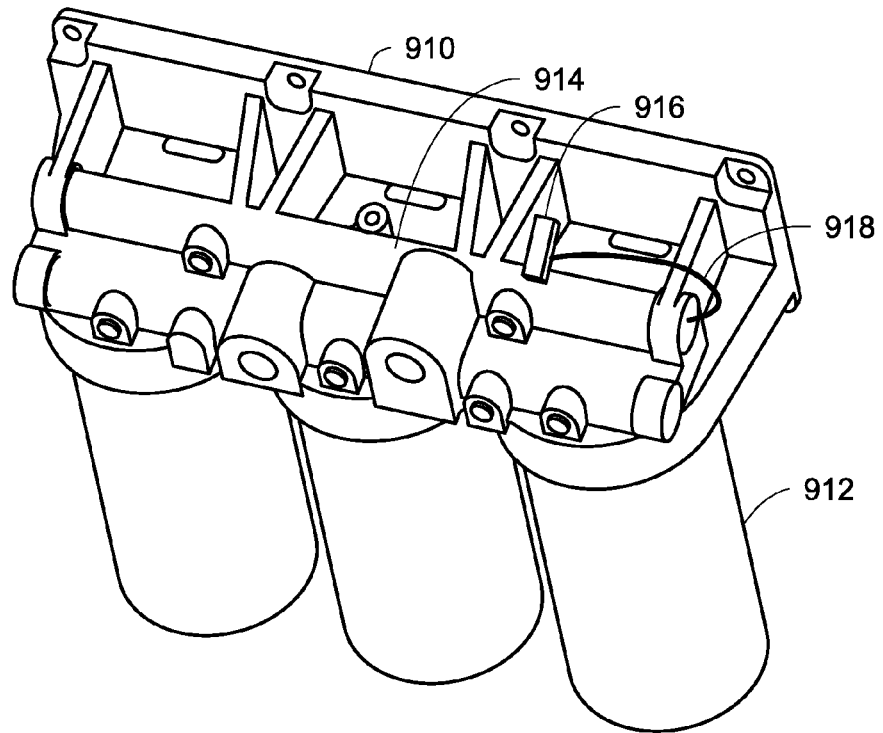
FIG. 11 is a top perspective view showing an embodiment of a reader for interrogating a surface acoustic wave sensor, where the reader is on a filter head and an antenna extends into a housing of the fluid filter.
Figure 12:
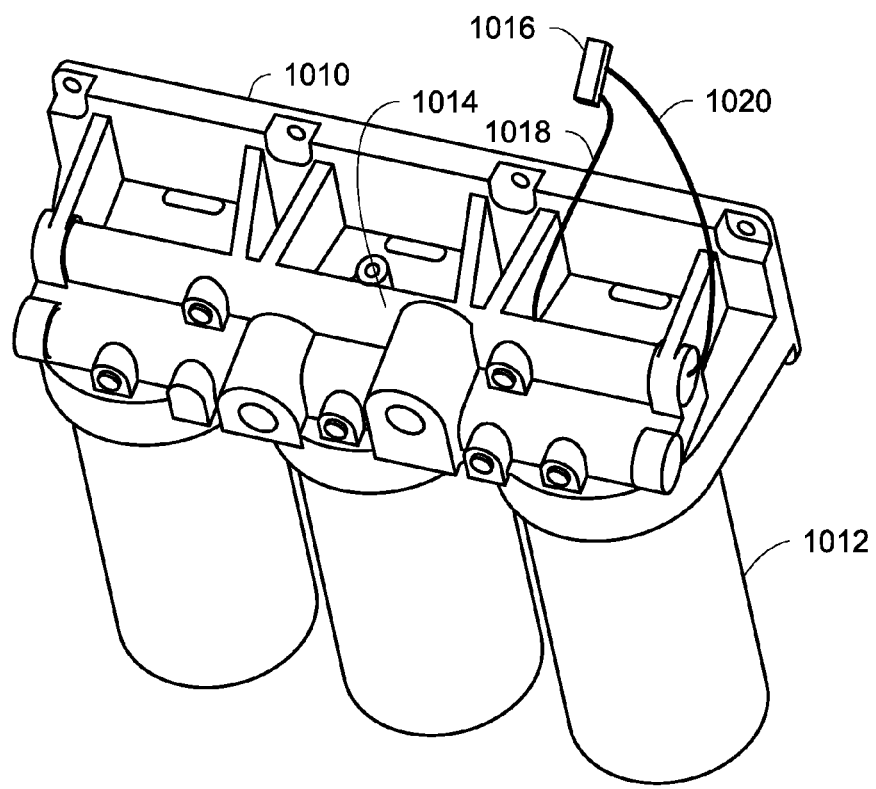
FIG. 12 is a top perspective view showing an embodiment of a reader for interrogating a surface acoustic wave sensor, where the reader is remotely disposed of the filter head and having antennae extending into a housing of the fluid filter.

FIGS. 10-12 show examples of placement of the reader. As described above, the reader in some embodiments has as an antenna and can generally be located on the engine or other equipment, including but not limited to anywhere in or near the engine compartment.

FIG. 10 is a top perspective view showing a reader 816 for interrogating a SAW sensor (not shown as it is inside the fluid filter 812), where the reader 816 is on a filter head 810. In the embodiment shown, the reader 816 is incorporated on the filter head 810 and is connected to the flow passage at 814. In order to work, radio frequency RF must be able to be transmitted between the SAW sensor and the reader 816, hence it is sometimes desirable to not have the two on opposite sides of a fluid filter housing/head that are made of a material would impede the RF communication between the sensor and reader. As shown in FIG. 10, the reader 816 is on the filter head on the outside of the fluid passage, but could be in close proximity with the sensor inside the filter, while communicating through the filter head. Thus, in appropriate circumstances, SAW sensors as described herein can be particularly beneficial when used with a non-metallic filter head.

It is recognized, however, that in cases where the housing is metal, other embodiments can be used, such as shown in FIGS. 11 and 12, where the barrier of a metal housing would not affect the function of the SAW sensor.

FIG. 11 is a top perspective view showing a reader 916 for interrogating a SAW sensor (not shown as it is inside the housing of the fluid filter 912), where the reader 916 is on a filter head 910 and an antenna 918 extends into a housing of the fluid filter 912. In the example shown, the antenna 918 extends into the flow passage 914 of the filter head and can extend into the housing of the fluid filter 912. That is, the reader 916 in the embodiment of FIG. 11 could be located as part of the filter head 910 but with its antenna extending into the fluid filter cavity.

FIG. 12 is a top perspective view showing a reader 1016 for interrogating a SAW sensor (not shown as it is inside the housing), where the reader 1016 is remotely disposed of the filter head 1010 and has antennae 1018 and 1020 extending into a housing of the fluid filter 1012. In the example shown, the reader 1016 and its antenna 1018, 1020 could be physically separated but electrically connected. The reader 1016 could be located elsewhere, such as for example on other equipment, on other engine equipment, or at an engine compartment, with its antenna 1018, 1020 extending into the filter cavity. In the example shown, but not meant to be limitative, the antenna 1018, 1020 could be placed at different positions of the flow passage 1014.

While not shown in FIGS. 10-12, it will be appreciated that the SAW sensor could be incorporated into or onto the filter or filter element with antenna located in the filter head (as opposed to part of the filter element) and be operatively connected to the SAW sensor, e.g. electrically. In this configuration, installation of the fluid filter would complete the sensor-antenna circuit for the SAW sensor and allow the response signal to be transmitted.

Figure 13:
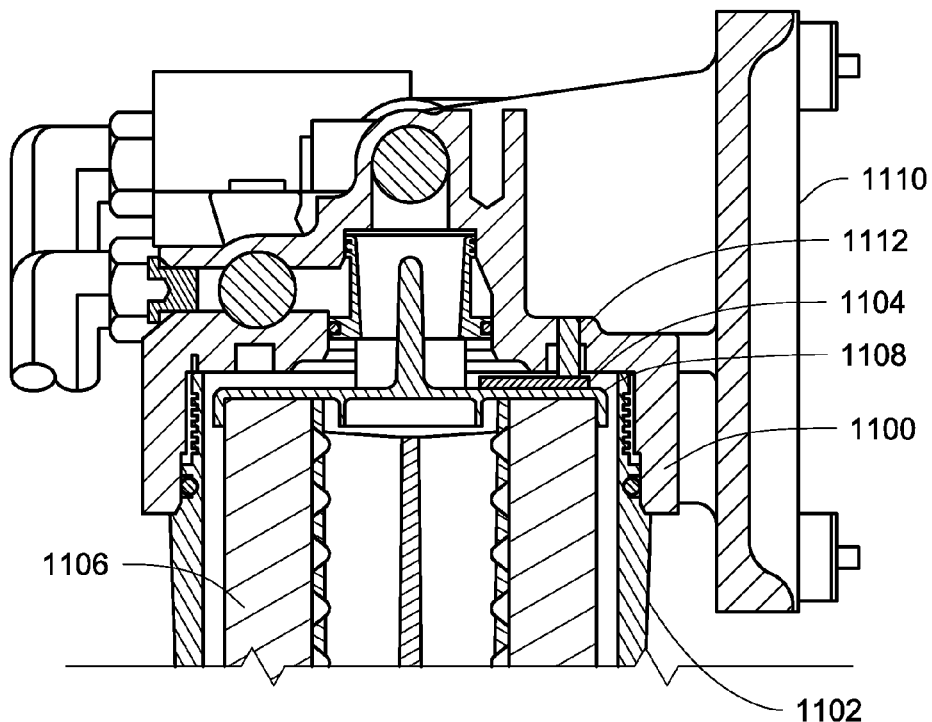
FIG. 13 is a partial sectional view of another embodiment of a replaceable product component that is fluid filter with a surface acoustic wave sensor on the fluid filter but with a transmitter such as an antenna on the filter head.

FIG. 13 shows where an antenna of the SAW sensor is physically located away from the sensor itself. FIG. 13 is a partial sectional view that shows one embodiment of a filter apparatus 1100 installed on a filter head 1110. The filter apparatus 1100 includes a fluid filter 1102 with a media 1106 for filtering fluid therethrough. A surface acoustic wave sensor 1104 is disposed on, for example, on an endplate 1108, such as a top endplate. As shown, the surface acoustic wave 1104 sensor is on the fluid filter 1102, but with an antenna 1112 on the filter head 1110. In such a configuration, installation of the fluid filter 1102 on the filter head 1110 would complete the sensor-antenna circuit for the SAW sensor 1104 and allow the response signal to be transmitted.

In operation, the fluid apparatus (with SAW sensor) and reader can detect whether an appropriate fluid filter is installed. In one embodiment, a method for detecting the presence of an appropriate filter includes sending an interrogation signal from a reader toward a fluid filter. The reader is configured to obtain certain data from a SAW sensor. This data corresponds to an appropriate response indicating that the fluid filter is an appropriate filter for use. A determination is made as to whether an appropriate response has been received as a result of sending the interrogation signal from the reader, such that when the data is received an appropriate response has been received. However, when the data is not received, such an inappropriate response or no response would indicate that the fluid filter is not appropriate for use. If there is an inappropriate response or no response, a warning is provided to indicate that the fluid filter is inappropriate for use.

In other embodiments, the SAW sensor as described herein can be employed to provide other useful operation information. As described above, the SAW sensor can also be designed to provide information on fluid pressure, pressure differentials, temperature, or chemical composition data.

In the example of obtaining information on pressure differential, two SAW sensors may be employed. For instance, one SAW sensor could be placed upstream or on the inlet of the fluid filter and another SAW sensor could be placed downstream or on the outlet of the fluid filter. Such a configuration could be used to provide data about filter pressure drop.

In alternative examples, filter pressure drop could be obtained by (1) appropriately locating a single SAW sensor (with access to both upstream and downstream pressures); (2) by employing a virtual sensor at one location, for instance by using another sensor or engine data to estimate pressure, and employing a single SAW sensor at the other location, the virtual sensor in appropriate circumstances is another sensor typically that may already be utilized for another function, but where its detection capability may be employed to also provide useful information in conjunction with the SAW sensor; (3) for multiple filter element/cartridge applications, a single SAW pressure sensor could be located in the filter head or its upstream (dirty) side passageways and each individual element or cartridge would possess a SAW pressure sensor located on the downstream (clean) side of the filter; or (4) also for multiple filter element/cartridge applications, a single SAW pressure sensor could be located in the filter head or its clean side passageways and each individual element or cartridge would possess a SAW pressure sensor located on the dirty side of the filter.

FIGS. 14-17 show representations of alternatives (1) to (4) above respectively.

Figure 14:
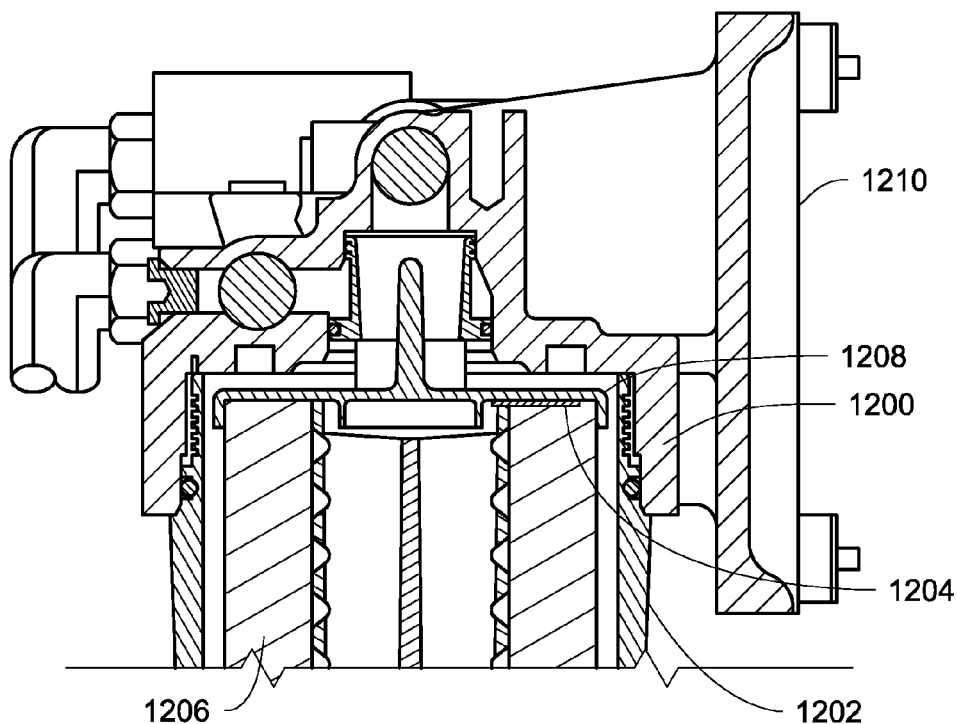
FIG. 14 is a partial sectional view of another embodiment of a replaceable product component that is fluid filter with a surface acoustic wave sensor on upstream and downstream sides of the fluid filter.

FIG. 14 is a partial sectional view of another embodiment of a filter apparatus 1200 with fluid filter 1202 installed on a filter head 1210. The filter apparatus 1200 includes a fluid filter 1202 with a media 1206 for filtering fluid therethrough. A surface acoustic wave sensor 1204 is located at both upstream and downstream sides of the fluid filter 1202. As shown, the sensor 1204 is disposed on an endplate, such as the top endplate, where the sensor has access to both the upstream and downstream sides, e.g. unfiltered and filtered sides.

Figure 15A:
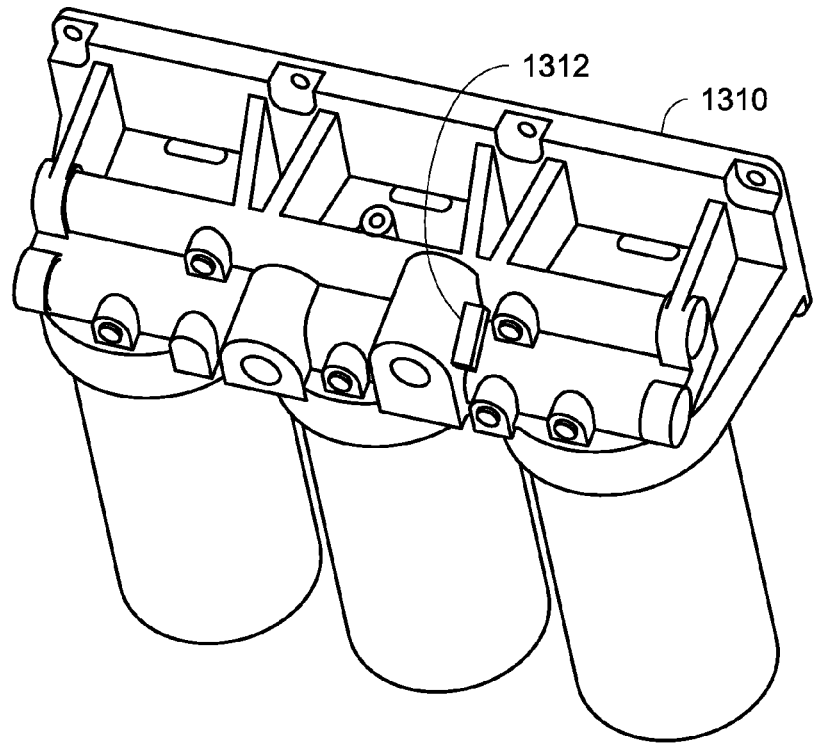
FIG. 15A shows another embodiment of a fluid filter assembly with multiple replaceable product components being fluid filters.
Figure 15B:
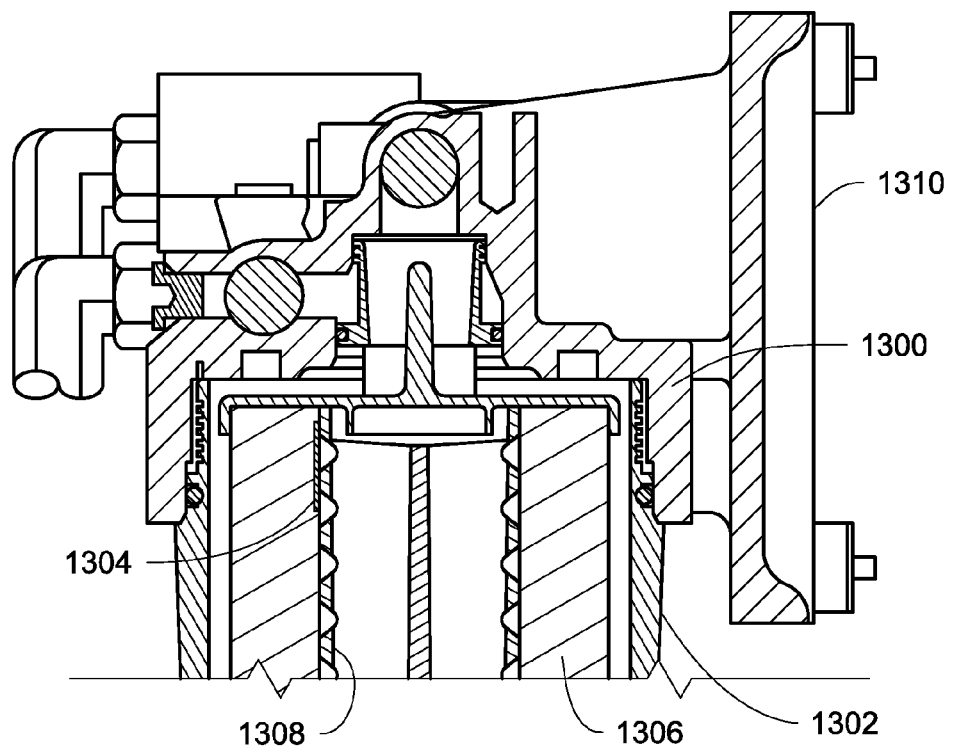
FIG. 15B shows a sectional of one of the fluid filters of FIG. 15A with a surface acoustic wave sensor on a downstream side of the fluid filter and another engine sensor that may be employed outside the fluid filter.

FIGS. 15A and 15B show another embodiment of a filter apparatus 1300 with fluid filter 1302 installed on a filter head 1310. The filter apparatus 1300 includes a fluid filter 1302 with a media 1306 for filtering fluid therethrough. A surface acoustic wave sensor 1304 is located on a downstream side of the fluid filter 1302 and another engine sensor 1312 that may be employed outside the fluid filter 1302. In this configuration, the engine sensor 1312 would operate as the virtual sensor employed with the surface acoustic wave sensor 1304. As shown, the surface acoustic sensor 1304 is on the center tube 1308, downstream of the media 1306. It will be appreciated that the sensor 1304 could be positioned at a location other than on the center tube 1308.

Figure 16A:
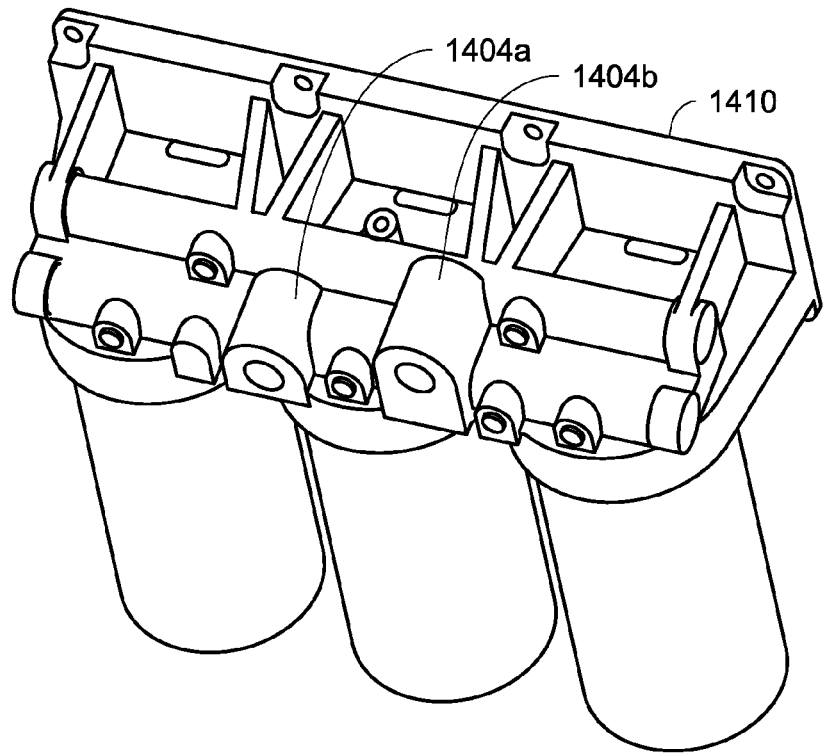
FIG. 16A shows another embodiment of a fluid filter assembly with multiple replaceable product components being fluid filters.
Figure 16B:
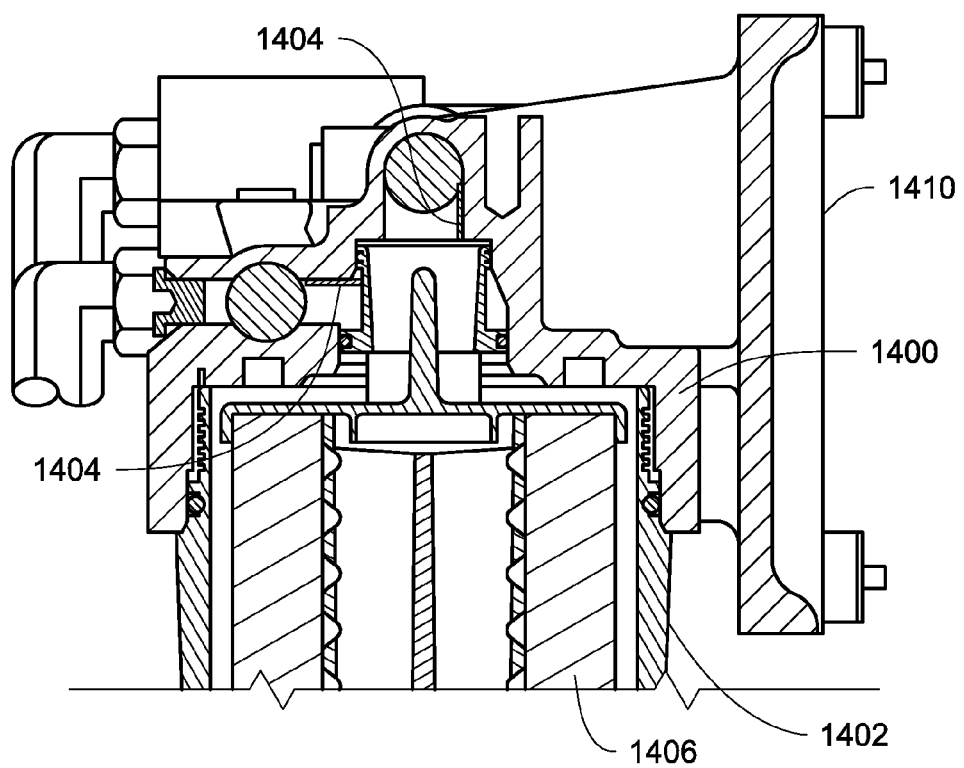
FIG. 16B show a sectional view of one of the fluid filters of FIG. 16A with a surface acoustic wave sensor not on the replaceable filter but with sensors on the filter head, one on an upstream side and the other on the downstream side.

FIGS. 16A and 16B show another embodiment of a filter apparatus 1400 with fluid filter 1402 installed on a filter head 1410. The filter apparatus 1400 includes a fluid filter 1402 with a media 1406 for filtering fluid therethrough. Surface acoustic wave sensors 1404 are located on the filter head 1410, rather than on the serviceable fluid filter 1402. One sensor 1404 is on an upstream side (e.g. dirty side) and the other sensor 1404 is on the downstream side (e.g. clean side). See also positions 1404a on the outlet and inlet 1404b of FIG. 16A as to where the inlet and outlet are located. Based on the earlier descriptions and figures, it will be appreciated that the sensors could just as easily be positioned on the serviceable fluid filter 1402 on upstream and downstream locations.

Figure 17A:
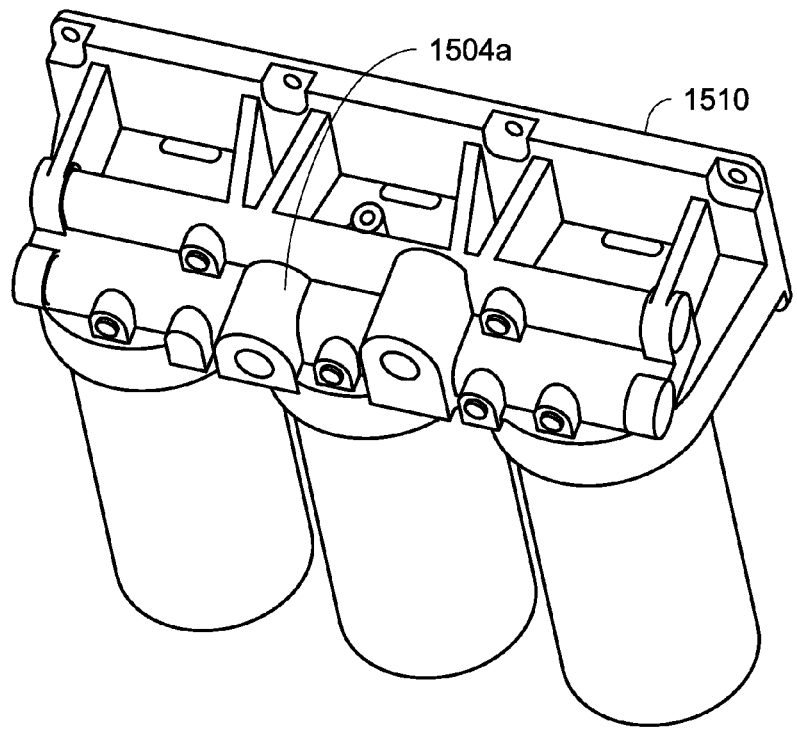
FIG. 17A shows another embodiment of a fluid filter assembly with multiple replaceable product components being fluid filters.
Figure 17B:
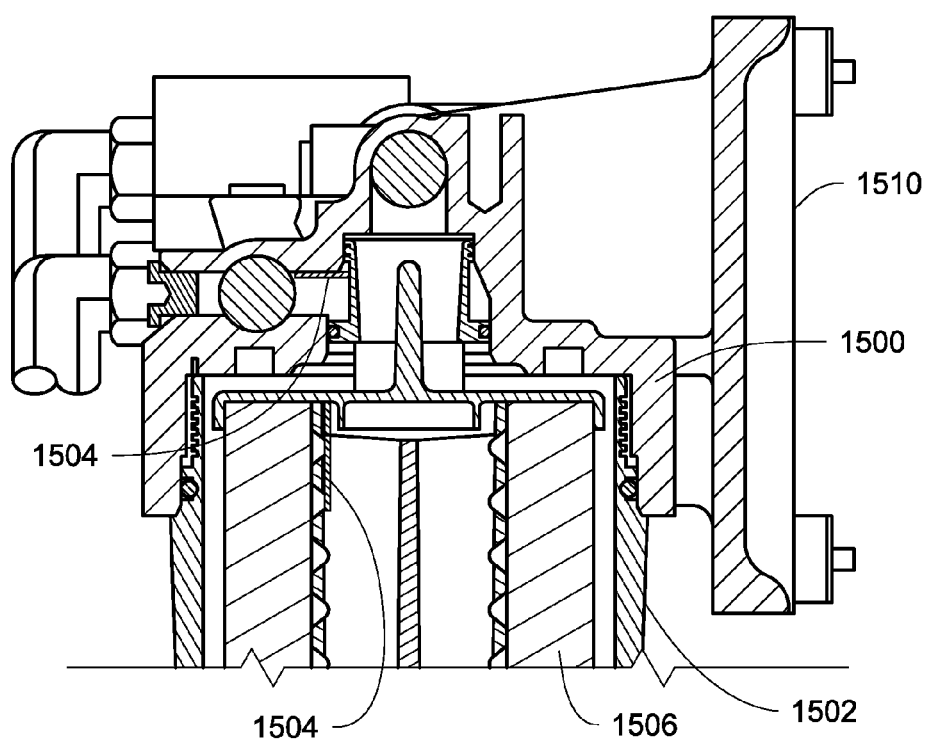
FIG. 17B shows a sectional view of one of the fluid filters of FIG. 17A with a surface acoustic wave sensor on the filter head on the upstream side, and the other on the fluid filter on the downstream side.

FIG. 17A and 17B is another embodiment of a filter apparatus 1500 with fluid filter 1502 installed on a filter head 1510. The filter apparatus 1500 includes a fluid filter 1502 with a media 1506 for filtering fluid therethrough. A surface acoustic wave sensor 1504 is located on the filter head 1510 on the upstream side, and the other sensor 1504 is on the fluid filter 1502 on the downstream side. In such a configuration, for multiple filter element/cartridge applications, a single SAW pressure sensor could be located in the filter head or its dirty side passageways and each individual element or cartridge would possess a SAW pressure sensor located on the clean side of the filter. It will be appreciated that the sensor on the filter head could be placed on the clean side or outlet and that the sensor(s) on the fluid filter could be placed upstream or on the dirty side.

It will be appreciated that in a like manner, fluid pressure, temperature or the presence of specific chemical species could be detected and monitored by the SAW. For detection of fluid pressure, the same sensor as above could be employed and, via algorithm, if an appropriate signal was not detected when the engine was started or after filter change (or other convenient time), it would give a warning or notify that inappropriate filter was installed and would be unable to provide the engine with this data. For detection of temperature or certain chemical species, a similar SAW sensor like the preceding examples could be configured appropriately to obtain this data. It will also be appreciated that sensors separate from the SAW sensor may be employed to obtain information on pressure, temperature, or the presence of chemical species.

It will be appreciated that the filter apparatus, system, and methodology described herein can be useful in various filtration applications, such as for example in protective systems of an engine. Such filters are used for example in liquid filtration, such as lubrication and fuel filters, as well as filtration applications that do not employ liquid filters, such as diesel exhaust fluids and air filters. It will be appreciated that the filter apparatus herein may be useful in filtration applications other than those just mentioned, and where there may be a general need to detect and help ensure that an appropriate filter is installed.

Among other advantages, incorporation of a SAW sensor into or onto a fluid filter or filter element is useful for determining whether a genuine (appropriate) filter has been installed and, in other applications, can also provide useful data concerning the condition of the filter (pressure drop, temperature) or fluid (temperature, pressure, chemical makeup).

Selection of a SAW sensor has advantages for example over other RFID such as IC-based (integrated circuit) RFID. As well known, IC RFID contains a small integrated circuit chip and a loop antenna. The benefit of the integrated circuit approach is that it allows for programmability so that one type of tag can be customized with many different IDs. However, since it is an electronic circuit, it requires power to operate. Power is acquired through the electromagnetic coupling with the reader and reader antenna. To transmit its information, the chip has to acquire enough power to "wake up" and execute its programming. Since this type of power transmission is a strong function of distance, the IC RFID must be very close to the reader antenna to operate. A battery can be added to greatly increase the range and speed of the IC RFID but the battery must be replaced over time and so the device is not truly passive. IC-based RFID also has the same temperature limitations of other electronic components which must be considered in underhood vehicle applications. As a result of these limitations (requirement for power, short range, environmental considerations) IC-based RFID is at least less desirable and may not be appropriate for many engine, hydraulic and equipment-protection applications.

FIGS. 18-23—Incorporation of Use-Status in Detecting Genuine Serviceable Product Components With reference to FIGS. 18-23, FIG. 18 shows another general embodiment of a structure for a serviceable product component 1800, where the serviceable component 1800 is used in a system to determine whether a serviceable product component to be installed (or already installed) is genuine or non-genuine. FIGS. 19-23 (described further below) illustrate flow charts of different embodiments 1900, 2000, 2100, 2200, 2300 on the implementation of the serviceable product component 1800 in the methodology of detecting a genuine or non-genuine component. Generally, the methodology, system, and component described herein detect between genuine and non-genuine serviceable product components and can provide information obtained during detection to an appropriate party. If a serviceable product component is determined to not be genuine after detection, then appropriate action may be taken to warn operators and document such findings.

It will be appreciated that the serviceable product component 1800 may employ the concepts and implementations described above with respect to FIGS. 1-17, and that such details and descriptions may be suitably and appropriately incorporated into the further descriptions and capabilities illustrated in FIGS. 18-23. It will also be appreciated that the serviceable product component 1800 may be, but is not limited to, a fluid filter.

As with FIGS. 1 and 2, for example, the serviceable product component 1800 can be detected as either a genuine component or a potentially non-genuine component. Similarly, this is done by using a targeted feature such as a product characteristic or marker to identify the serviceable product component as genuine, and using a way to detect the characteristic or marker and relay the information detected. Such detection capability can also help to improve a protected system's life and reduce its chance of failure, by detecting whether a serviceable component of such a protected system is genuine.

Figure 18:
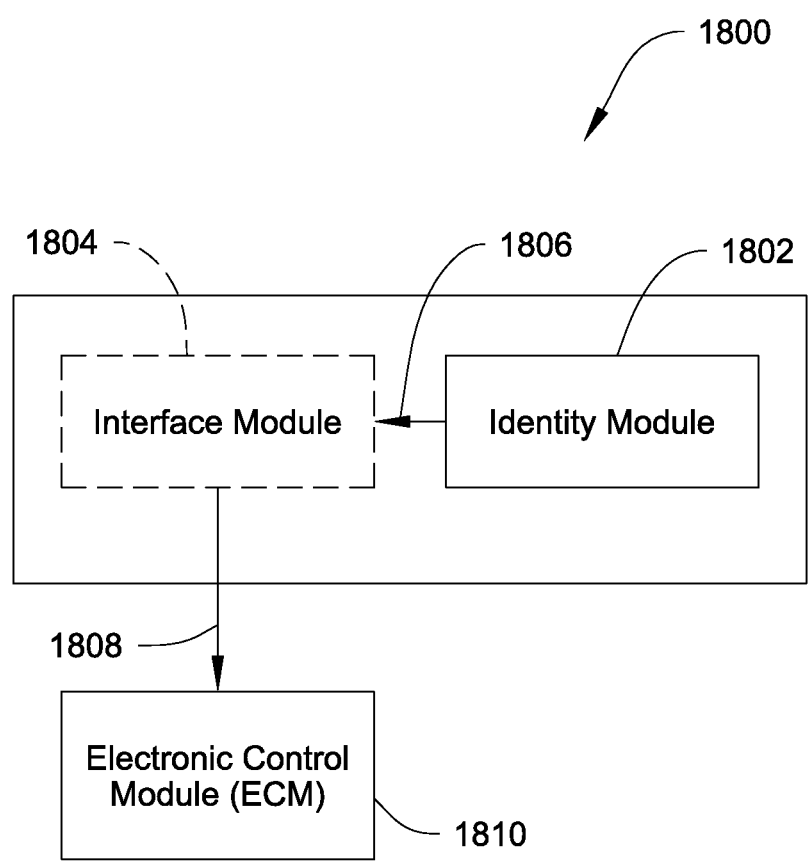
FIG. 18 shows one embodiment of identity modules that may be affixed to a replaceable product component.

With reference to FIG. 18, the serviceable product component 1800 generally includes one or more identity modules 1802 affixed or otherwise disposed or put on the serviceable product component 1800. The identity module 1802 is configured to interface with an electronic control module (ECM) 1810, for example through an interface module 1804 (see arrows 1806 and 1808). As shown, the interface module 1804 is part of the serviceable product component 1800. However, it will be appreciated that the interface module 1804 may be physically separate from the serviceable product component 1800 (see dashed box of 1804). For example, the interface module 1804 may be disposed on another fixed component that connects the serviceable product component 1800 to an overall system. In the example of a fluid filter, the interface module 1804 could be connected to or part of a mounting module or a filter head.

With reference to the identity module 1802, the identity module 1802 includes the identity of the serviceable product component 1800 and forms the basis for determining whether a genuine component has been installed. In some embodiments, the identity module 1802 includes a targeted feature such as described above with respect to FIGS. 1 and 2. That is, the identity module 1802 may include at least one or more of a unique marker and/or design characteristic of the serviceable product component 1800. Likewise, the interface module 1804 may include a sensor and incorporate such concepts as described above with respect to FIGS. 1 and 2. It will be appreciated that the interface module 1804 may include, if appropriate, a reader configured to obtain an output produced by the sensor of the interface module 1804. Readers are known and are not further described. It also will be appreciated that such a reader can be a separate component that is not part of the interface module 1804 and serviceable product component 1800, but otherwise interacts with, e.g. interrogates, the interface module 1804 such as when the interface module 1804 employs a sensor.

As described above, it will be appreciated that by serviceable product component, included within this application are product components such as those that are replaceable parts of an assembly and/or system, for example a protected system, such as but not limited to systems of an engine. A serviceable product component may contain either or both durable components, for example a fuel injector that must be serviced such as by being replaced or reconditioned at the end of their useful life, and consumable components, for example an oil filter that must be replaced periodically in the normal course of maintaining the product. A component that is targeted for detection, whether durable or consumable (or one that includes both), has an identity module (e.g. identity module 1802) disposed on or otherwise a part of the respective component.

As shown in FIG. 18, the serviceable product component 1800 may be part of a system including the ECM 1810. The serviceable product component 1800 can be utilized by an existing or otherwise dedicated electronic control module. An appropriate interface module 1804 is configured to retrieve information contained in the identity module 1802. It will be appreciated that the ECM 1810 can handle multiple serviceable product components that may be targeted for genuine detection, as long as appropriate interface modules are employed to relay information detected from a particular serviceable product component. Information contained in the identity module 1802 can include, but is not limited to, a preferably unique component Identity Code and an In-Use Status Flag.

With reference to the Identity Code, the Identity Code is contained within the identity module 1802. The Identity Code provides a unique identification of the serviceable product component 1800. The Identity Code includes a targeted feature such as described above with respect to FIGS. 1 and 2 for example, which may include at least one or more of a unique marker and/or design characteristic of the serviceable product component 1800.

With reference to the In-Use Status Flag, the In-Use Status Flag is a setting included within an In-Use Status Module that is contained within the identity module 1802. In one embodiment, the In-Use Status Flag is intended to provide information that would help prevent inappropriate re-use of a serviceable product component. Particularly, the In-Use Status Flag refers to information that the serviceable product component 1800 carries about its use (whether or not it has yet been used). The In-Use Status Module allows the status of the In-Use Status Flag to be detected and reset. For example, the In-Use Status Module is configured to produce a detectable signal based on the information of the In-Use Status Flag to indicate past use (or non-use) of the serviceable product component. The In-Use Status Module is also configured so that the In-Use Status Flag can be changed or updated, for example by control of the ECM, so as to set the In-Use Status Flag and indicate the use status of the serviceable product component.

In one embodiment, the In-Use Status Flag is a consumable element of the identity module 1802 that, once consumed, would show that the serviceable product component 1800 has been used and discourage its re-use. That is, once the In-Use Status Flag has been set to indicate that the status of the component is used, this is an irreversible status change, such that the component could not be reset as not having been used. It will be appreciated however, that further/additional use of the component can be updated on the In-Use Status Module of the used component, where the component is appropriately being used in the system which is has already been installed.

As one example of operation, when a serviceable product component 1800 is newly installed or is used to replace a previously installed component, the In-Use Status Module includes an algorithm that stores the identity code and permanently resets the In-Use Status Flag to discourage re-use of the component 1800 in another product. To meet the intended function, the serviceable product component 1800 would be labeled as being a "used" component once it has been installed. In one embodiment, the labeling may occur by a response of the serviceable product component's In-Use Status Module to a specific event, such as but not limited to for example at initial system activation, such as at ignition key-on or by a signal from the ECM 1810.

It will be appreciated that the In-Use Status Module is not limited to the configuration above and may be any appropriate consumable element that allows a status of use to be indicated. In other examples, the In-Use Status Module in appropriate circumstances could be a fuse that burns outs as soon as the component is first used. For example, it could be constructed as an electrical fuse, a material that dissolves or decomposes in use, or a programmable chip that responds to an external signal or stimulus. Such constructions are known and need not be further described, and can be suitably adapted for use with the methods, systems, and component configurations herein.

It will further be appreciated that the identity module 1802 may be configured to be tamper resistant. For example, the identity module 1802 may be disposed in an encapsulated material or be potted into a structure of the serviceable product component, including any necessary microelectronics if appropriate. By tamper resistant, the intent is that if the identity module 1802 were to be taken apart or structurally interfered with, the identity module 1802 would be rendered non-useful and may be damaged or otherwise destroyed.

With reference to the ECM 1810, it will be appreciated that the ECM 1810 is a processor that includes the necessary software and algorithm configurations, and if necessary appropriate hardware. As shown, the ECM 1810 is a separate control unit that interfaces with the identity module 1802 of the component 1800, through the interface module 1804, thus forming the detection system. It will also be appreciated that in appropriate circumstances and depending on the product, the ECM 1810 may be a general systems processor or a part of a certain product or system that the serviceable product component 1800 is a replaceable part of.

In operation, the interface module 1804 retrieves the Identity Code from the identity module 1802 of the component 1800, such as for example at a significant event point in the normal operation of the product in which the component is to be installed. Such a significant event point can include, but is not limited to for instance, at start-up of the engine such as at ignition key on or by a signal from the ECM 1810. Other significant event points can include, but are not limited to, servicing events such as a manually activated system check, a periodic diagnostic, and/or a triggered check of all replacement parts when one suspect is detected.

Generally, an algorithm executable within the ECM 1810 determines the validity of the Identity Code. In the event that a valid Identify Code is detected and the In-Use Status Flag indicates that the component has been newly installed or replaced, the algorithm stores the identity code and permanently resets the In-Use Status Flag to discourage reuse of the component in another product.

Generally, the product in which the component is presently installed will continue to recognize and accept this particular component by virtue of its Identity Code matching that earlier stored. A will-fit, unauthorized reconditioned, counterfeit, or otherwise non-genuine component would generally not escape detection by the logic described above.

The following provides descriptions of detection of genuine and non-genuine components with reference to flow charts of FIGS. 19-23. In FIGS. 19-23, an overall configuration of detection is shown, but where the respective figures focus on certain aspects.

Detection of Genuine Components

Figure 19:
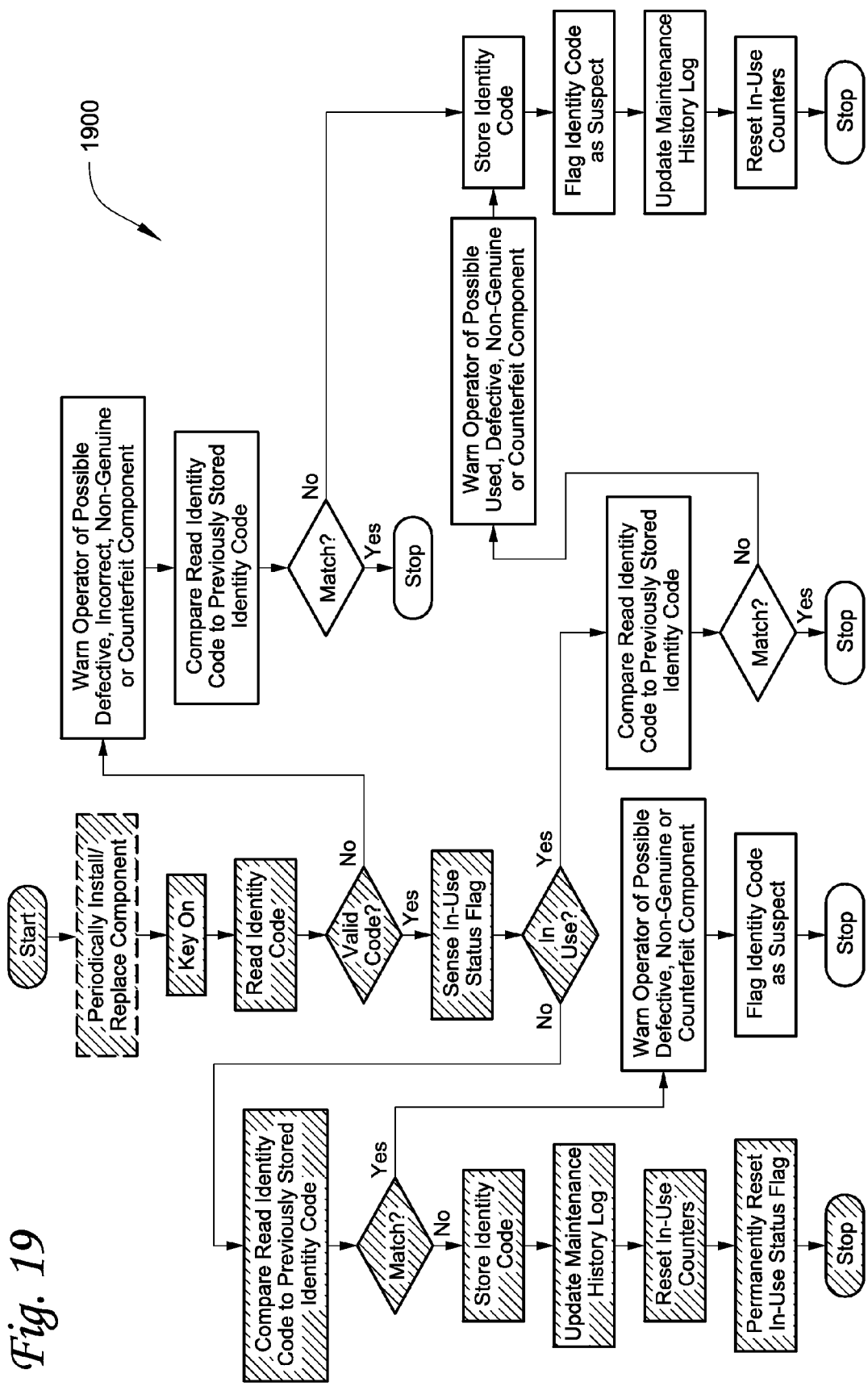
FIG. 19 is a flow chart of a process in which a newly installed/replaced product component is detected as a genuine component.

FIG. 19 is a flow chart of a process 1900 in which a newly installed/replaced product component is detected as a genuine component. Particularly, FIG. 19 illustrates logic that is applied to for example interrogate a genuine component upon its initial periodic installation or replacement into a product system. See hatched logic boxes of flow chart at the left of FIG. 19. Such a component change (i.e. installation/replacement) may be, but is not limited to, for example changing of an oil filter of an engine.

Following such an installation or replacement, the product system would be activated for use, such as for example "keyed on." In one embodiment, an Identify Code, which may be encrypted and contains information sufficient to determine the authenticity and applicability of the component to the product system, would be read from an Identity Module and checked for validity. For example, the ECM is used to check the validity of the Identity Code. In the case a valid Identify Code is read, an In-Use Status Flag, contained within an In-Use Status Module of the Identity Module would be detected. It would be expected that an initially installed or replaced component would return an indication of not being in use. Whereupon the just read Identify Code would be compared to a possibly previously stored code. In the case no match is found (i.e. no previously stored code or no matching stored code), the new Identity Code is stored. In some embodiments, any one or more of the following could occur: a maintenance history log is updated, counters are used to integrate component use over time in hours, cycles, or other suitable units are reset. As one preferred example, the component's In-Use Status Flag is permanently reset to indicate that the particular component is in use.

Figure 20:
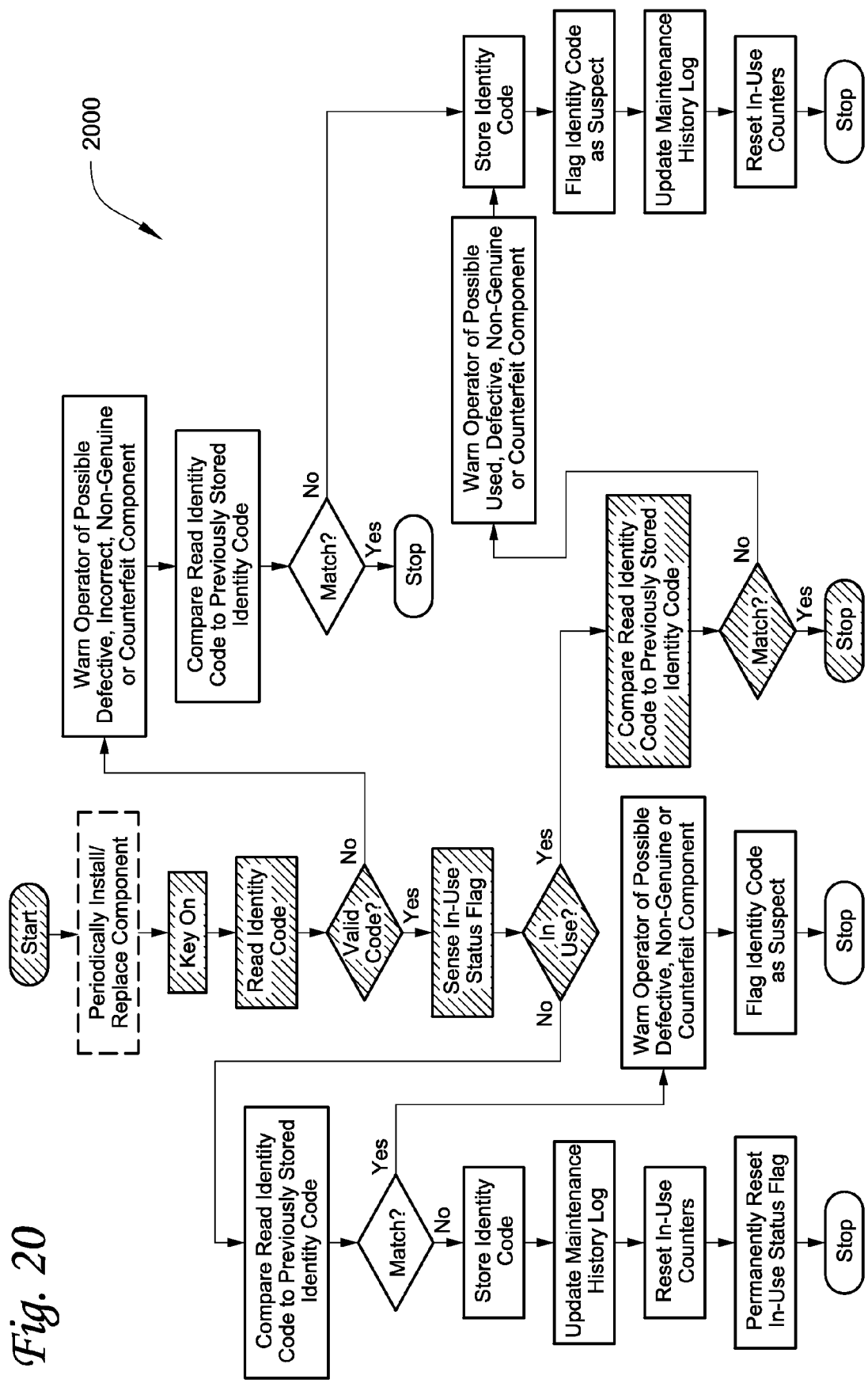
FIG. 20 is a flow chart of a process in which a previously installed/replaced product component is detected as a genuine component.

FIG. 20 is a flow chart of a process 2000 in which a previously installed/replaced product component is periodically checked so as to detect it as a genuine component and allowed for continued use. Particularly, FIG. 20 illustrates logic that is applied to for example interrogate a component during product activations subsequent to initial activation as was described with respect to FIG. 19. See hatched logic boxes of flow chart in the middle of FIG. 20.

Upon product activation, a component Identity Code is again read from the Identity Module on the component and checked for validity, and the In-Use Status Flag is sensed. Where the Flag previously was indicated as not in use (e.g. in FIG. 19), the Flag would now be indicated as in use. It would also be expected that the just read Identify Code would match a previously stored Identify Code, such as from the earlier initial activation. In the embodiment shown, checks are made in both cases and processing stops if both expectations are met, i.e. the component is considered genuine.

In some embodiments, the In-Use Status Module includes use log and counter functions. Since the In-Use Status Flag is indicated as in use, in-use counters previously introduced at initial activation would continue to integrate use of the component to the last entry made to the maintenance history log, so that new use can be added to accumulating use.

Detection of Possibly Defective, Non-Genuine, or Counterfeit Components

Figure 21:
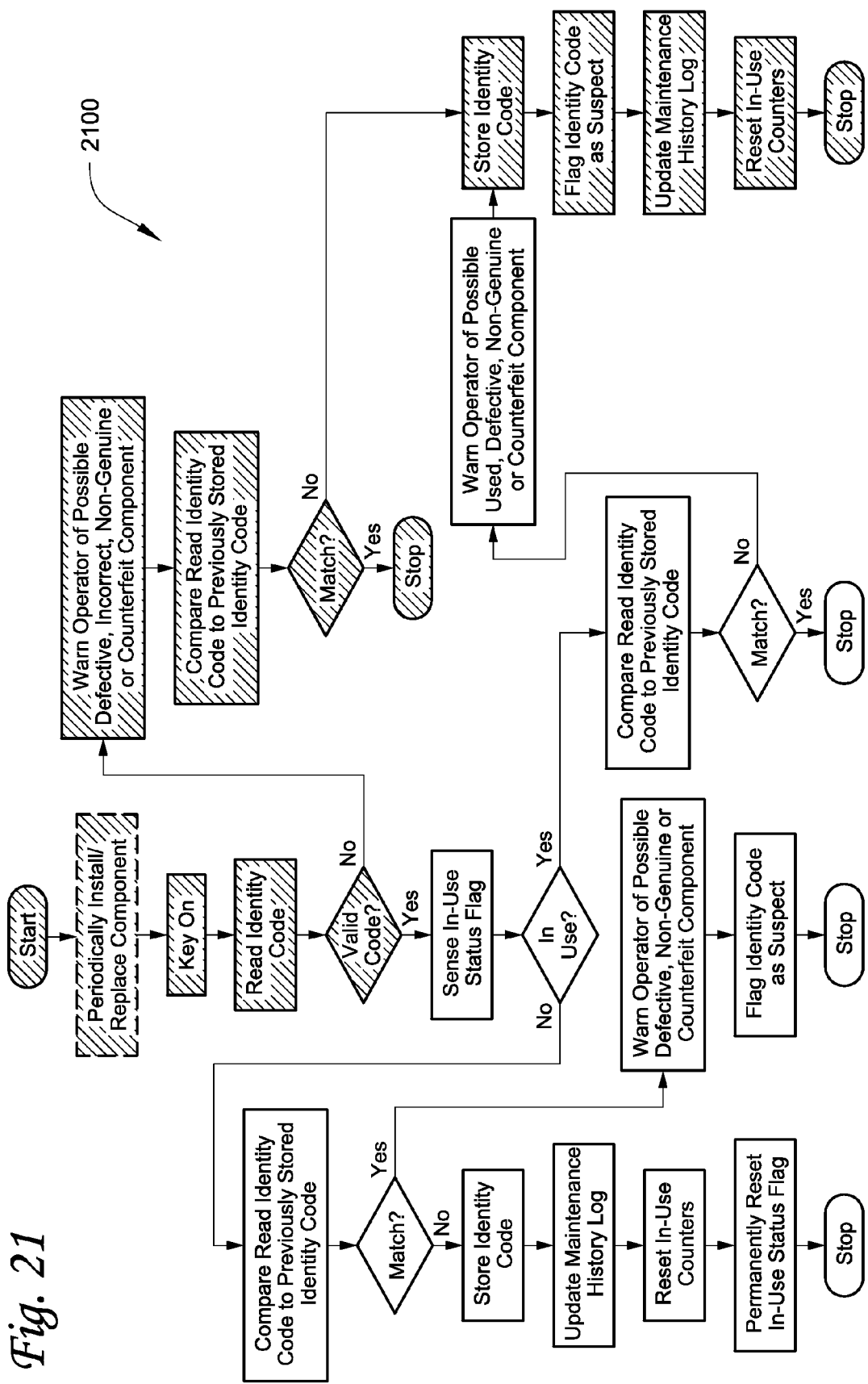
FIG. 21 is a flow chart of a process in which an installed/replaced product component is detected as a non-genuine, incorrect, defective, incorrectly applied, and/or counterfeit component.
Figure 22:
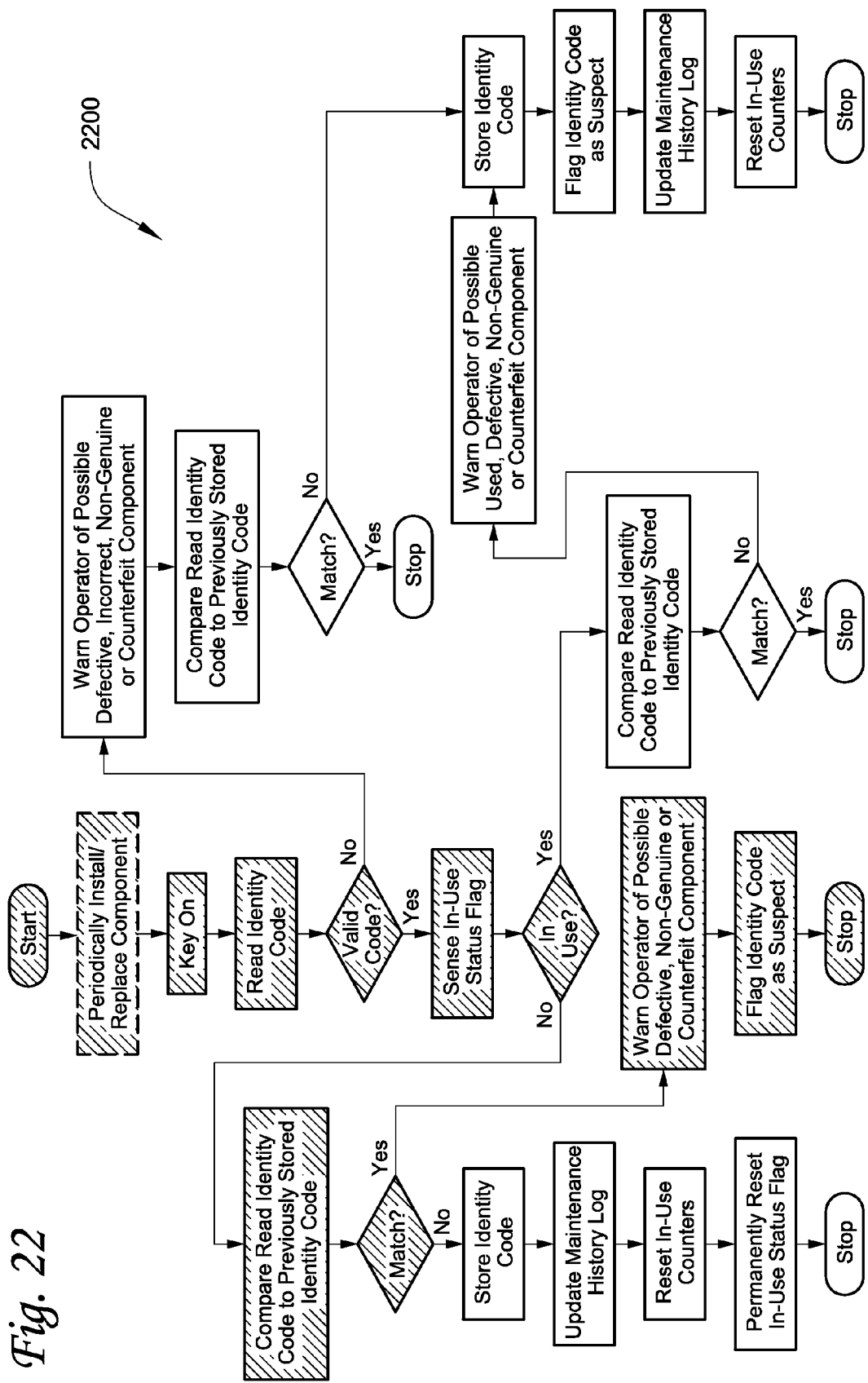
FIG. 22 is a flow chart of a process in which an installed/replaced product component is detected as possibly a non-genuine, incorrect, defective, incorrectly applied, and/or counterfeit component.
Figure 23:
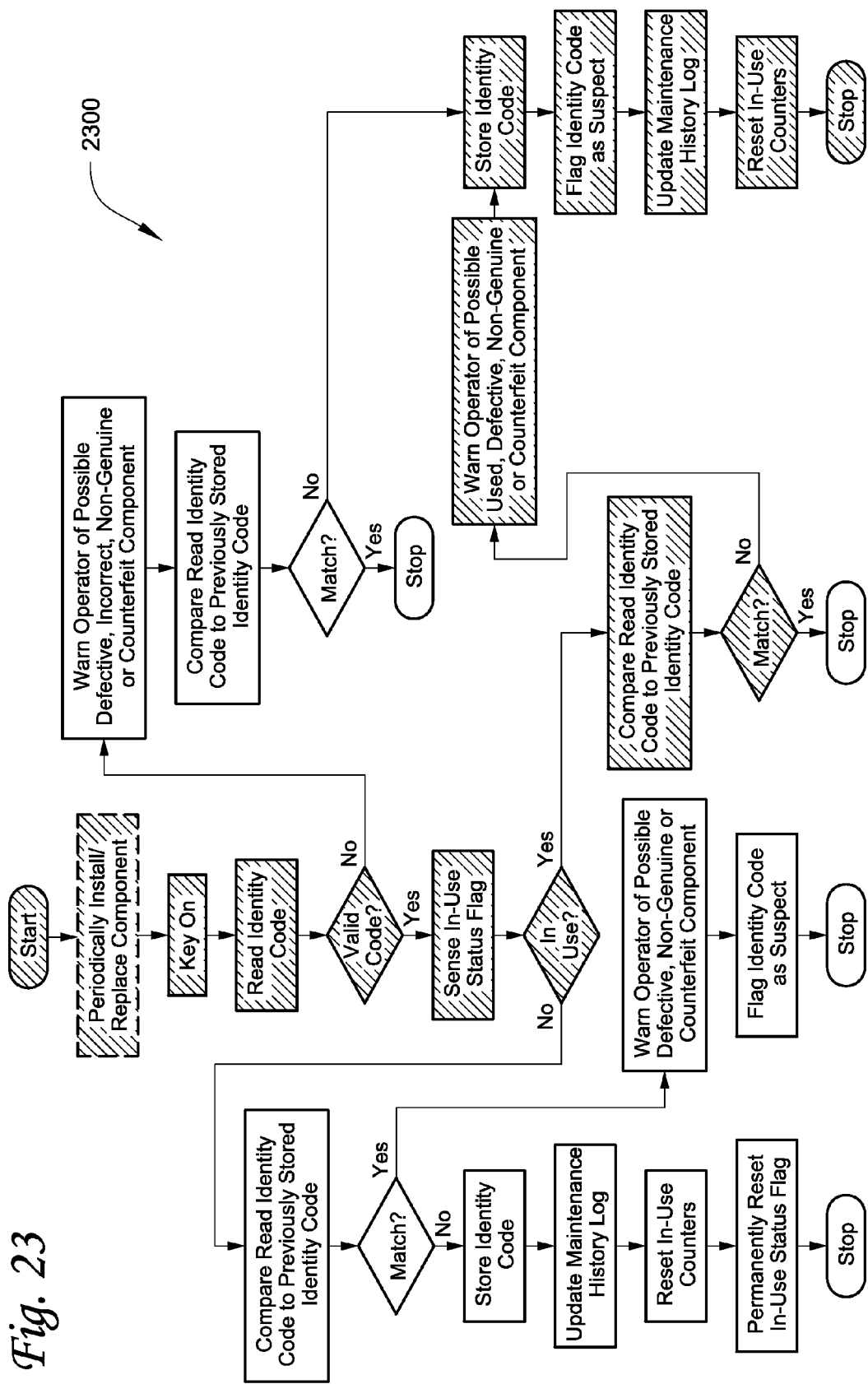
FIG. 23 is a flow chart of another process in which an installed/replaced product component is detected as a non-genuine, incorrect, defective, incorrectly applied, and/or counterfeit component.

FIGS. 21 through 23 illustrate logic of the invention disclosed herein applied to for example interrogate potentially defective, incorrectly applied, non-genuine, and/or counterfeit components.

FIG. 21 is a flow chart of a process 2100 in which an installed/replaced product component is detected as a non-genuine, incorrect, defective, incorrectly applied, or counterfeit component. In FIG. 21, a component Identity Code is found to be not valid at the time of product activation and the operator is warned that the component may be defective, incorrect, non-genuine, or counterfeit. See hatched logic boxes of flow chart at top of FIG. 21 flowing to the right and downward.

FIG. 21 shows a general methodology on identifying an invalid Identity Code. It will be appreciated that other alternatives could be employed when using an Identity Code, such as employing enhanced content and format (e.g., encryption) and correspondingly enhanced interrogation logic that can allow for additional separate determinations to be made before validation occurs. It will also be appreciated that other actions might supplement or replace warning the operator, such as but not limited to warning an operations administrator, warning a service center, warning a base that derates the system, and/or simply maintaining a log.

After taking the appropriate action, such as warning the operator, a check is made to see if the just read Identity Code matches the most previously stored Identity Code. In the case a match is not found, the Identity Code is stored to the extent that provisions can be made to accommodate it as-is, and it is flagged as suspect. In some embodiments, the maintenance history log is then updated and in-use counters reset. By the foregoing logic, an operator is appropriately warned of a suspect component being detected, and the event and subsequent use of the suspected component are documented with the product electronic control module (ECM) for later review. With further reference to FIG. 21, where the component with the invalid Identity Code continues to be used, the invalid Identity Code would match the previously stored invalid Identity Code. This represents further use of the previously stored invalid code, and it is not necessary to add a new entry to history log, but simply maintain existing entry (e.g. add to accumulating use of invalid component). That is, accumulating and continued use of a suspect can be logged.

FIG. 22 is a flow chart of a process 2200 in which an installed/replaced product component is detected as possibly a non-genuine, incorrect, defective, incorrectly applied, or counterfeit component. Particularly, FIG. 22 illustrates the situation of a valid component Identify Code matching any previously stored code prior to being put in-use. It is not expected that a unique Identity Code associated with a newly installed or replaced and properly functioning genuine component would match any previously stored Identity Code, unless there was a failure to earlier permanently reset the In-Use Status Flag. Another possible explanation might be that the component is non-genuine or counterfeit. In any case, the operator is warned and the Identity Code flagged as suspect so that the component may be further examined to determine whether it is genuine.

As shown in FIG. 22, the logic is simplified to anticipating that a match, if any, would occur to the most recent previous entry to the Maintenance History Log. In the event that a match would be made to an older entry in the Maintenance History Log, in appropriate circumstances, the Identify Code may still be stored as a new entry to the Maintenance History Log, flagged as suspect, and in-use counters would be reset. This latter approach would provide a way to detect reuse of an Identity Code, in what are intended to be unique Identity Codes. Thus, a duplicate code may be indicative of counterfeiting. Identity codes are meant to be unique on their own or together with other information to identify the serviceable component (e.g. component part and/or model number). So in either event, if the identity codes matches the most recent previous entry or matches an older entry, the component is at least identified as a suspect. FIG. 22 shows an example where the identity code matches the most recent entry.

FIG. 23 is a flow chart of another process 2300 in which an installed/replaced product component is detected as a non-genuine, incorrect, defective, incorrectly applied, or counterfeit component. Particularly, FIG. 23 illustrates the situation of a valid component Identity Code, for a component recognized as being in use, but not matching a previously stored code. It is expected that a matching Identity Code would have been previously stored for a properly functioning genuine component, unless there was a failure to store the Identity Code. A failure to find a matching Identity Code might suggest a used, defective, not genuine, or counterfeit component.

In this situation, another attempt will be made to store the Identity Code, flag the code as a suspect, update the maintenance log, and reset in-use counters.

In some embodiments, contents of the Maintenance History Log and In-Use Counters may be retrievable by, or on behalf of, an entity or party of interest (e.g. company from which the product came) during routine service, maintenance, and warranty claims processing. It also will be appreciated that the same contents might be made available to other entities such as distributors, dealers, service centers, owners, and operators to provide a basis for value adding product and service offerings such as product monitoring tools and services. Such contents can include, but are not limited to, installation date information; manufacturing information, such as location, date, materials, and component type; encryption information, use information and flags and appropriate descriptions. It will be appreciated that the contents of the maintenance history log and in-use counters would available in any of the other flow chart situations (e.g. FIGS. 19-22), and may be manually or programmatically retrieved.

In summary, the algorithms illustrated in the flowcharts of FIGS. 19-23 describe what happens to: (1) enable use of new genuine part (see FIG. 19); (2) allow the continued use of the part on the same engine (see FIGS. 20); and (3) warn if it is not a genuine part (see FIG. 21). The scenarios described in FIGS. 22 and 23 may be applicable, for example if each individually manufactured component has a unique identity code.

However, it will be appreciated that an identity code may be unique to a manufactured part to which the serviceable product component is associated. Thus, all similarly manufactured serviceable product components may have the same identity code, rather than having an identity code unique to only one individual serviceable product component. In such a product component configuration, other markers, characteristics in addition to the identity code may be employed as appropriate to identify whether the product component is genuine.

The concepts herein have many benefits, in providing a type of anti-piracy system. Included among some of the features and advantages are for example:

(i) The utilization of one or more sensors to determine and identify the installation of a genuine component (e.g. fluid filter), as opposed to a non-genuine or inappropriate component and to inform or warn of the potential functional and legal consequences when an inappropriate filter is installed.

(ii) With respect to genuine fluid filter marking, the components can simply include a fluid filter, filter-type sensor with an appropriate output device to detect non-genuine filters and determine inappropriate installation, an ECM and decision algorithms.

(iii) Can identify genuine or appropriate filters based on a targeted feature which may be unique marker on or within the filter or may be design, structural, or material characteristic of the filter itself and uses this to distinguish genuine filters from other potentially similar but non-genuine products.

(iv) Can use a sensor/s that detects marker features on genuine filters or measures distinguishing characteristics properties of the filter.

(v) Can issue a fault code if an inappropriate filter is installed and a warning to inform of potential functional and legal consequences of use of such an inappropriate product.

The process, system, and component configuration described herein can be useful in various applications, such as for example in systems that have serviceable parts, for instance in the detection of genuine components of protected systems, including but not limited to fluid filters of a filtration system in an engine. In the example of the serviceable (or replaceable) component being a fluid filter, such filters may be disposable and used for instance in liquid filtration systems including but not limited to for example lubrication, fuel, coolant, hydraulic, or liquid urea. Such filters may also be employed in filtration systems that do not filter liquids, including but not limited to for example systems that filter diesel exhaust fluids, crankcase ventilation, and intake air. It will be appreciated that the methodology and system herein may be useful in filtration applications other than those just mentioned, and in applications for components that are not filters but where there may be a general need to detect and help ensure that a genuine component is installed.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A method of detecting the presence of a genuine product component to be installed as a serviceable product component of an engine comprising:

detecting, with a sensor, information from a serviceable product component to be installed in an engine, the information including an identity code information providing a unique identification of the serviceable product component;

detecting an in-use status information from an in-use status module of the serviceable product component, the in-use status information indicating inappropriate re-use of the serviceable product component;

receiving, with an electronic control module, the information detected from the serviceable product component;

determining with the electronic control module whether the serviceable product component is genuine based on the information received from the sensor, where the determination is made such that:

when the information detected by the sensor is verified by the electronic control module as being from an appropriate targeted feature of the serviceable product component, the serviceable product component is deemed genuine, the appropriate targeted feature including one or more of a marker disposed on or within the serviceable product component and/or a characteristic of the serviceable product component itself;

when the information detected by the sensor is determined by the electronic control module as not being from the appropriate targeted feature, the serviceable product component is deemed as a suspect, and when no information is detected by the sensor, the electronic control module deems the serviceable product component as a suspect; and updating the in-use status information of the in-use status module to indicate that the serviceable product component is used when determining that the serviceable product component is genuine, wherein the in-use status information includes an in-use status flag, and wherein updating the in-use status information includes setting the in-use status flag to indicate that the serviceable product component is used upon at least one of an ignition key-on event or the in-use status module receiving a signal from the electronic control module.

2. The method of claim 1, wherein the serviceable product component is a fluid filter.

3. The method of claim 2, further comprising:
sending an interrogation signal from a reader toward the fluid filter, the reader is configured to obtain certain data from the surface acoustic wave sensor, the data corresponds to an appropriate response indicating that the fluid filter is an appropriate filter for use;
determining whether an appropriate response has been received as a result of sending the interrogation signal, such that
when the data is received an appropriate response has been received, and
when the data is not received an inappropriate response or no response indicates that the fluid filter is not appropriate for use; and
providing a warning to indicate that the fluid filter is inappropriate for use, when there is an inappropriate response or no response.

4. The method of claim 1, wherein the serviceable product component includes a physical proprietary interface, and the method further comprises detecting the physical proprietary interface, such that when the information detected by the sensor is determined by the electronic control module as not being from the appropriate targeted feature, and when the physical proprietary interface is detected, the serviceable product component is deemed a suspect.

5. The method of claim 1, further comprising:
detecting, with an interface module, information from a serviceable product component to be installed in an engine, the interface module including a sensor;
receiving, with an electronic control module, the information detected from the interface module;
determining whether the product component is genuine based on the information received from the interface module, where a determination is such that:
when the information detected by the interface module is verified by the electronic control module as being from an appropriate identity module, the product component is deemed genuine, such that the appropriate identity module is disposed on the product component and has an identity component and a status of use component, which are configured to indicate that the product component is genuine;
when the information detected by the interface module is determined by the electronic control module as being from an invalid identity module, the product component is deemed as a suspect, and
when no information is detected by the interface module, the electronic control module deems the product component as a suspect.

6. The method of claim 1, wherein the in-use status module includes at least one of a fuse that burns out when the serviceable product component is used or a material that dissolves or decomposes when the serviceable product component is used, and
wherein updating the in-use status information includes at least one of burning out the fuse, or dissolving or decomposing the material.

7. The method of claim 1, further comprising an identity module of the serviceable product component destroying or rendering itself non-useful when the identity module detecting a tampering event of the identity module.

8. A system for detecting the presence of a genuine fluid filter apparatus comprising:
a fluid filter that has a media that filters fluid therethrough, the fluid filter including an in-use status module that has an in-use status information used to indicate inappropriate re-use of the fluid filter;
a targeted feature possessing at least one or more of a unique marker and/or design characteristic, the targeted feature is disposed on or within the fluid filter;
a sensor configured to detect the targeted feature, the sensor is configured to obtain information on the targeted feature and create an output based on the information, the information including an identity code information providing a unique identification of the fluid filter;
an electronic control module configured to receive the output from the sensor, and compare the information to one or more expected values, configured to receive the in-use status information from the in-use status module, and configured to determine whether the fluid filter is genuine based on the comparison and the in-use status information, and when the fluid filter is not genuine, is configured to perform any one or more of the following: (1) generate and log a fault code, (2) inform of potential function& consequences of installing a non-genuine fluid filter, and (3) report to a party potential of unauthorized use,
wherein the fluid filter is configured to update the in-use status information of the in-use status module to indicate that the fluid filter is used when the electronic control module determines that the fluid filter is genuine,
wherein the in-use status information includes an in-use status flag, and
wherein updating the in-use status information includes setting the in-use status flag to indicate that the fluid filter is used upon at least one of an ignition key-on event or the in-use status module receiving a signal from the electronic control module.

9. The system of claim 8, wherein the design characteristic includes a physical proprietary interface of the fluid filter.

10. The system of claim 8, wherein the sensor is a surface acoustic sensor.

11. The system of claim 8, further comprising:
an identity module disposed on the serviceable product component, the identity module having an identity component storing the identity code information, the identity component including the targeted feature; and
an interface module to allow communication between the identity module and the electronic control module, the interface module including the sensor,
the electronic control module is configured to determine whether the serviceable product component is genuine based on the information detected from the identity component and the status of use component.

12. The system of claim 11, wherein the identity code information stored in the identity component of the identity module is unique to only one individual serviceable product component.

13. The system of claim 11, wherein the identity code information stored in the identity component of the identity module is unique to a manufactured part to which the serviceable product component is associated.

14. The system of claim 11, wherein the in-use status information of the in-use status module includes a counter to record use information with respect to the serviceable product component.

15. A fluid filter comprising
a filter element having a media that filters fluid therethrough; and
an identity module disposed on the fluid filter, the identity module having an identity component storing identity code information, the identity component including a targeted feature possessing at least one or more of a unique marker and/or design characteristic, the targeted feature is disposed on or within the filter element, and the targeted feature is configured to identify the fluid filter as a genuine fluid filter product;

an in-use status module provided as part of the fluid filter, the in-use status module providing an in-use status information used to indicate inappropriate re-use of the fluid filter; and an interface module to allow communication between the identity module and an electronic control module, wherein the in-use status information includes an in-use status flag and is configured to be updated to indicate that the fluid filter is used when the electronic control module determines that the fluid filter is genuine via the interface module, and wherein the in-use status information is configured to be updated by setting the in-use status flag to indicate that the fluid filter is used upon at least one of an ignition key-on event or the in-use status module receiving a signal from the electronic control module.

16. The fluid filter of claim 15, further comprising a surface acoustic wave sensor disposed on a portion of the fluid filter, the surface acoustic wave sensor is configured to produce a readable output, the output is configured to indicate whether the fluid filter is an appropriate filter for use.

17. The filter apparatus of claim 16, wherein the surface acoustic wave sensor is configured to detect a chemical species present in the fluid.

18. A system according to claim 16, comprising the filter apparatus of claim 11; a reader configured to interrogate the surface acoustic wave sensor and obtain a response outputted from the surface acoustic wave sensor, the response indicates whether the fluid filter is an appropriate filter for use; and a control unit configured to receive the response from the reader and determine whether the fluid filter is an appropriate filter based on the response.

19. The filter apparatus of claim 16, wherein the surface acoustic wave sensor is configured to detect at least one of a fluid pressure, a fluid pressure differential, and a fluid temperature.

* * * * *

UNITED STATES PATENT AND TRADEMARK OFFICE
CERTIFICATE OF CORRECTION

| | | |
|---|---|---|
| PATENT NO. | : 8,673,137 B2 | Page 1 of 1 |
| APPLICATION NO. | : 13/044018 | |
| DATED | : March 18, 2014 | |
| INVENTOR(S) | : Barry M. Verdegan et al. | |

It is certified that error appears in the above-identified patent and that said Letters Patent is hereby corrected as shown below:

In the Claims

Column 28, claim 8, line 18, "function&" should be --functional--.

Signed and Sealed this
Thirtieth Day of September, 2014

Michelle K. Lee
*Deputy Director of the United States Patent and Trademark Office*